United States Patent
Wakai et al.

(10) Patent No.: US 10,885,668 B2
(45) Date of Patent: Jan. 5, 2021

(54) CROSSING POINT DETECTOR, CAMERA CALIBRATION SYSTEM, CROSSING POINT DETECTION METHOD, CAMERA CALIBRATION METHOD, AND RECORDING MEDIUM

(71) Applicant: Panasonic Intellectual Property Management Co., Ltd., Osaka (JP)

(72) Inventors: Nobuhiko Wakai, Osaka (JP); Takeo Azuma, Kyoto (JP); Kunio Nobori, Osaka (JP); Satoshi Sato, Kyoto (JP); Ayako Maruyama, Osaka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 0 days.

(21) Appl. No.: 16/458,489

(22) Filed: Jul. 1, 2019

(65) Prior Publication Data

US 2019/0325610 A1    Oct. 24, 2019

Related U.S. Application Data

(62) Division of application No. 15/803,784, filed on Nov. 5, 2017, now Pat. No. 10,388,030.

(30) Foreign Application Priority Data

Nov. 18, 2016 (JP) ................................ 2016-225398
Jun. 29, 2017 (JP) ................................ 2017-126841

(51) Int. Cl.
*G06T 7/80*    (2017.01)
*H04N 17/00*    (2006.01)
(Continued)

(52) U.S. Cl.
CPC ............... *G06T 7/80* (2017.01); *G06T 7/13* (2017.01); *G06T 7/75* (2017.01); *H04N 5/23293* (2013.01);
(Continued)

(58) Field of Classification Search
CPC .... G06T 7/80; G06T 7/75; G06T 7/13; G06T 2207/20164; G06T 2207/30208; G06T 2207/30244; H04N 5/23293; H04N 17/002
(Continued)

(56) References Cited

U.S. PATENT DOCUMENTS

2011/0216184 A1    9/2011    Sakagami et al.
2012/0229431 A1    9/2012    Hiroki
(Continued)

FOREIGN PATENT DOCUMENTS

JP    4-143873    5/1992
JP    10-155091    6/1998
(Continued)

OTHER PUBLICATIONS

Roger Y. Tsai, "A Versatile Camera Calibration Technique for High-Accuracy 3D Machine Vision Metrology Using Off-The-Shelf TV Cameras and Lenses", IEEE Journal of Robotics and Automation, vol. 3, No. 4, Aug. 4, 1987, pp. 323-344.
(Continued)

*Primary Examiner* — Jefferey F Harold
*Assistant Examiner* — Omer Khalid
(74) *Attorney, Agent, or Firm* — Wenderoth, Lind & Ponack, L.L.P.

(57) ABSTRACT

A crossing point detector includes memory and a crossing point detection unit that reads out a square image from a captured image in the memory, and detects a crossing point of two boundary lines in a checker pattern depicted in the
(Continued)

square image. The crossing point detection unit decides multiple parameters of a function model treating two-dimensional image coordinates as variables, the parameters optimizing an evaluation value based on a difference between corresponding pixel values represented by the function model and the square image, respectively, and computes the position of a crossing point of two straight lines expressed by the decided multiple parameters to thereby detect the crossing point with subpixel precision. The function model uses a curved surface that is at least first-order differentiable to express pixel values at respective positions in a two-dimensional coordinate system at the boundary between black and white regions.

1 Claim, 27 Drawing Sheets

(51) Int. Cl.
G06T 7/73 (2017.01)
G06T 7/13 (2017.01)
H04N 5/232 (2006.01)

(52) U.S. Cl.
CPC . *H04N 17/002* (2013.01); *G06T 2207/20164* (2013.01); *G06T 2207/30208* (2013.01); *G06T 2207/30244* (2013.01)

(58) Field of Classification Search
USPC .......................................................... 348/175
See application file for complete search history.

(56) References Cited

U.S. PATENT DOCUMENTS

| 2014/0379114 | A1 | 12/2014 | Nakamura |
| 2015/0019000 | A1* | 1/2015 | Nakamura ............. G05D 25/02 700/120 |
| 2017/0071554 | A1* | 3/2017 | Fukuda ................ A61B 6/4452 |

FOREIGN PATENT DOCUMENTS

| JP | 11-066324 | 3/1999 |
| JP | 2007-192832 | 8/2007 |
| JP | 2011-188083 | 9/2011 |
| JP | 2012-007980 | 1/2012 |
| JP | 2012-146132 | 8/2012 |
| JP | 2014-035196 | 2/2014 |
| JP | 2014-230215 | 12/2014 |
| JP | 2015-007866 | 1/2015 |
| JP | 2015-016610 | 1/2015 |

OTHER PUBLICATIONS

The Extended European Search Report dated Jun. 25, 2018 for the related European Patent Application No. 17201108.2.
Lucchese L et al: "Using saddle points for subpixel feature detection in camera calibration targets", Circuits and Systems, 2002. APC-CAS'02. 2002 Asia-Pacific Conference on Oct. 28-31, 2002, Piscataway, NJ, USA, IEEE, vol. 2, Oct. 28, 2002 (Oct. 28, 2002), pp. 191-195, XP010620808.

* cited by examiner

FIG. 6

| | MEAN | STANDARD DEVIATION | ROOT MEAN SQUARE | MAXIMUM |
|---|---|---|---|---|
| MANUAL DETECTION WITH PIXEL PRECISION BY OPERATOR | 0.72 | 0.37 | 0.81 | 1.95 |

UNITS: PIXELS

FIG. 7

| CROSSING POINT DETECTION WITH SUBPIXEL PRECISION ACCORDING TO FUNCTION MODEL | MEAN | STANDARD DEVIATION | ROOT MEAN SQUARE | MAXIMUM |
|---|---|---|---|---|
| | 0.08 | 0.06 | 0.10 | 0.24 |

UNITS: PIXELS

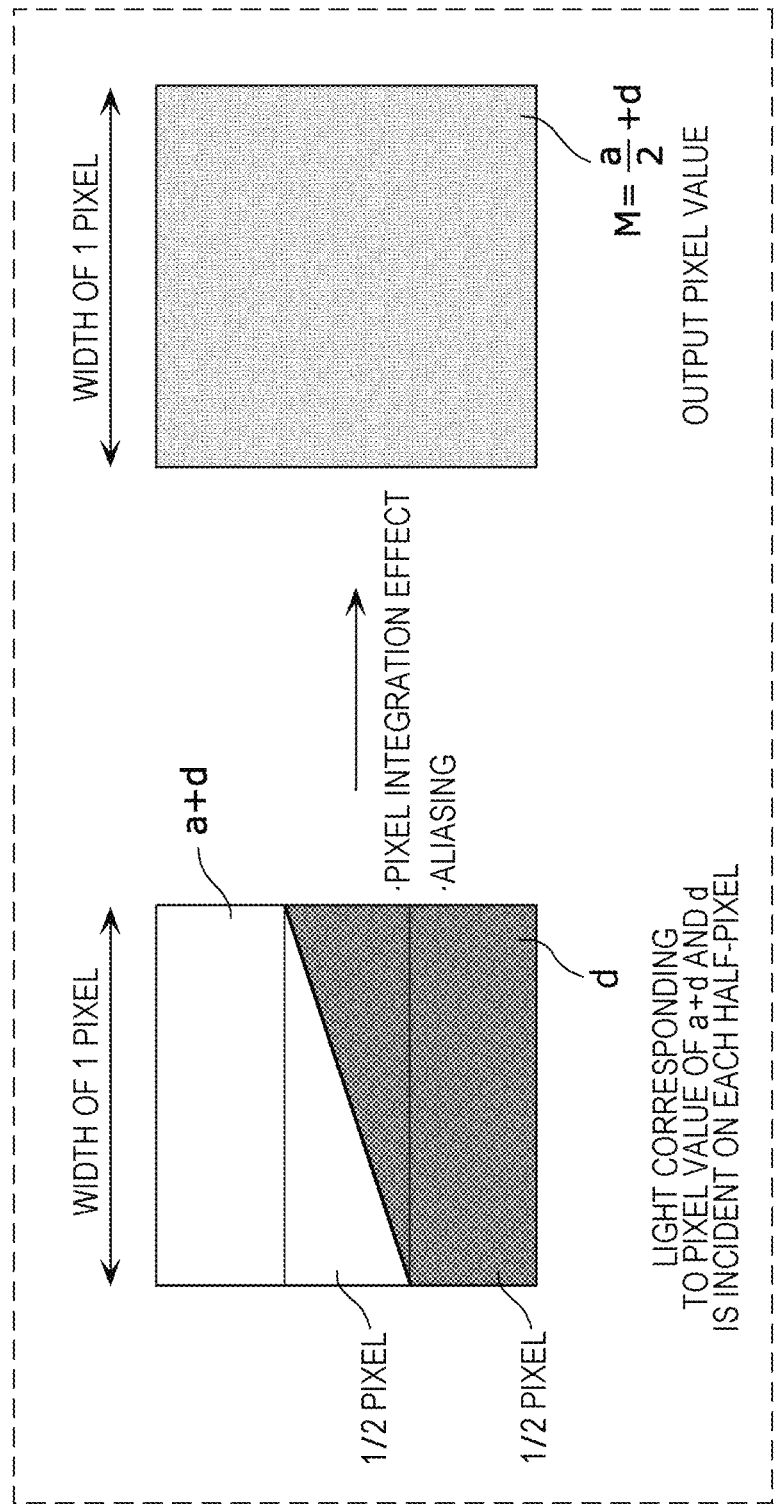

CASE OF 1 STRAIGHT LINE PASSING THROUGH 1 PIXEL

FIG. 20

| | MEAN | STANDARD DEVIATION | ROOT MEAN SQUARE | MAXIMUM |
|---|---|---|---|---|
| CROSSING POINT DETECTION WITH SUBPIXEL PRECISION ACCORDING TO NUMERICAL MODEL | 0.03 | 0.03 | 0.04 | 0.17 |

UNITS: PIXELS

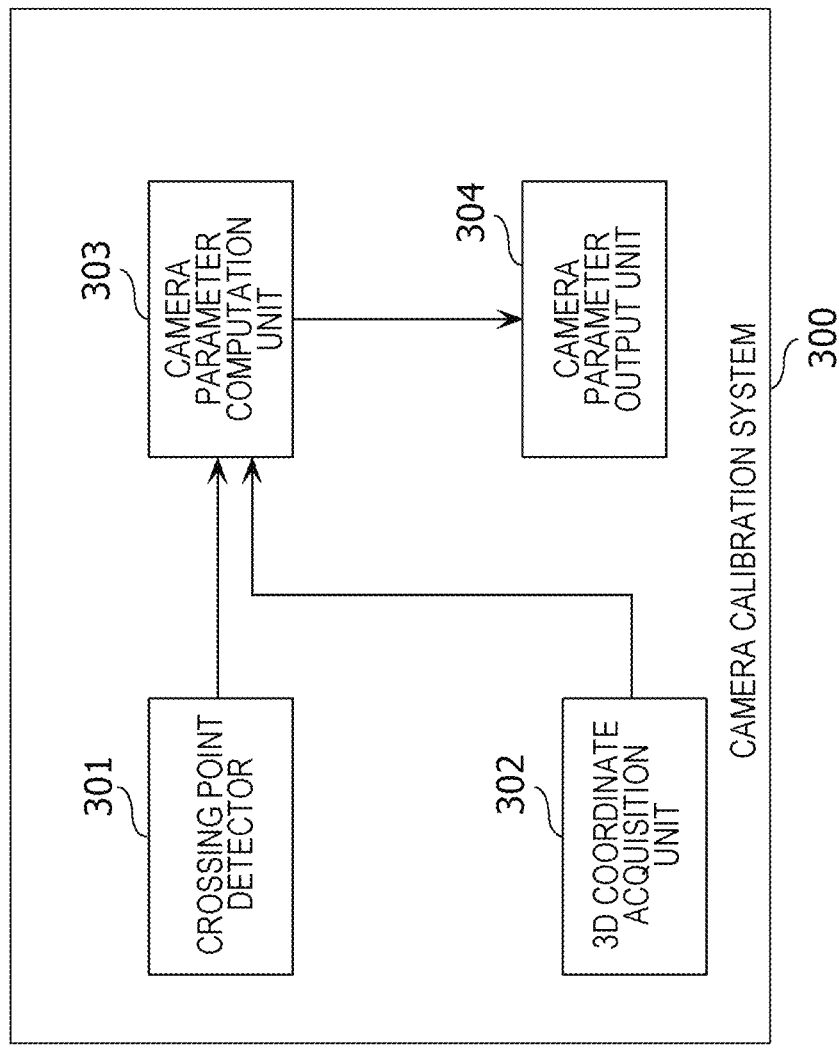

CROSSING POINT DETECTOR, CAMERA CALIBRATION SYSTEM, CROSSING POINT DETECTION METHOD, CAMERA CALIBRATION METHOD, AND RECORDING MEDIUM

BACKGROUND

1. Technical Field

The present disclosure relates to a crossing point detector, a camera calibration method, and the like that detect crossing points in a checker pattern from a captured image depicting the checker pattern.

2. Description of the Related Art

To calibrate a camera such as a vehicle-mounted camera, it is necessary to associate positions in three-dimensional space, or in other words positions in a three-dimensional coordinate system, with pixel positions in a captured image obtained by imaging with a camera. For this objective, in the related art, a crossing point detector uses a camera to image a checker pattern having a known shape. Subsequently, the crossing point detector detects crossing points in the checker pattern depicted in the captured image, and thereby associates positions in a three-dimensional coordinate system with pixel positions in the captured image (for example, see Japanese Unexamined Patent Application Publication Nos. 2011-188083, 2015-007866, 2014-230215, 2014-035196, 10-155091, Japanese Patent Nos. 5432835 and 4825980, and Roger Y. Tsai, "A versatile camera calibration technique for high-accuracy 3D machine vision metrology using off-the-shelf TV cameras and lenses", IEEE Journal of Robotics and Automation, Vol. 3, pp. 323-344, 1987).

SUMMARY

However, with the technology cited above, there is a problem of low detection precision of crossing points in the checker pattern.

One non-limiting and exemplary embodiment provides a crossing point detector capable of improving the detection precision of crossing points in a checker pattern.

In one general aspect, the techniques disclosed here feature a crossing point detector including a memory that stores a captured image obtained by imaging a checker pattern, and a processor that reads out at least a partial image of the captured image from the memory as an image to process, and detects a crossing point of two boundary lines in the checker pattern depicted in the image to process. Each of the two boundary lines is a boundary line between a first region made up of multiple pixels having a first pixel value and a second region made up of multiple pixels having a second pixel value greater than the first pixel value in the image to process. The processor decides multiple parameters of a function model that treats two-dimensional image coordinates as variables, the parameters being parameters for optimizing an evaluation value based on a difference between respective pixel values represented by the function model and respective pixel values in the image to process. The processor computes a position of a crossing point of two straight lines expressed by the decided multiple parameters, and thereby detects with subpixel precision the crossing point of the two boundary lines in the image to process. The function model uses a curved surface that is at least first-order differentiable to express the first region and the second region in a two-dimensional coordinate system, and also pixel values at respective positions in the two-dimensional coordinate system at a boundary between the first region and the second region.

It should be noted that general or specific embodiments may be implemented as a system, method, integrated circuit, computer program, or computer-readable recording medium, and may also be realized by an arbitrary combination of an apparatus, system, method, integrated circuit, computer program, and recording medium. Computer-readable recording media include non-volatile recording media such as Compact Disc—Read-Only Memory (CD-ROM), for example.

According to the present disclosure, the detection precision of crossing points in a checker pattern can be improved. Additional benefits and advantages of the disclosed embodiments will become apparent from the specification and drawings. The benefits and/or advantages may be individually obtained by the various embodiments and features of the specification and drawings, which need not all be provided in order to obtain one or more of such benefits and/or advantages.

BRIEF DESCRIPTION OF THE DRAWINGS

FIG. 6 is a diagram illustrating the precision of manual detection of crossing points by an operator with pixel precision;

FIG. 7 is a diagram illustrating the detection precision of crossing points by a crossing point detector using a function model according to Embodiment 1;

FIG. 11 is a diagram illustrating an example of a pixel integration effect;

FIG. 20 is a diagram illustrating the detection precision of crossing points by a crossing point detector using a numerical model according to Embodiment 2;

FIG. 25 is a block diagram of a camera calibration system according to Embodiment 5;

Figure 1:
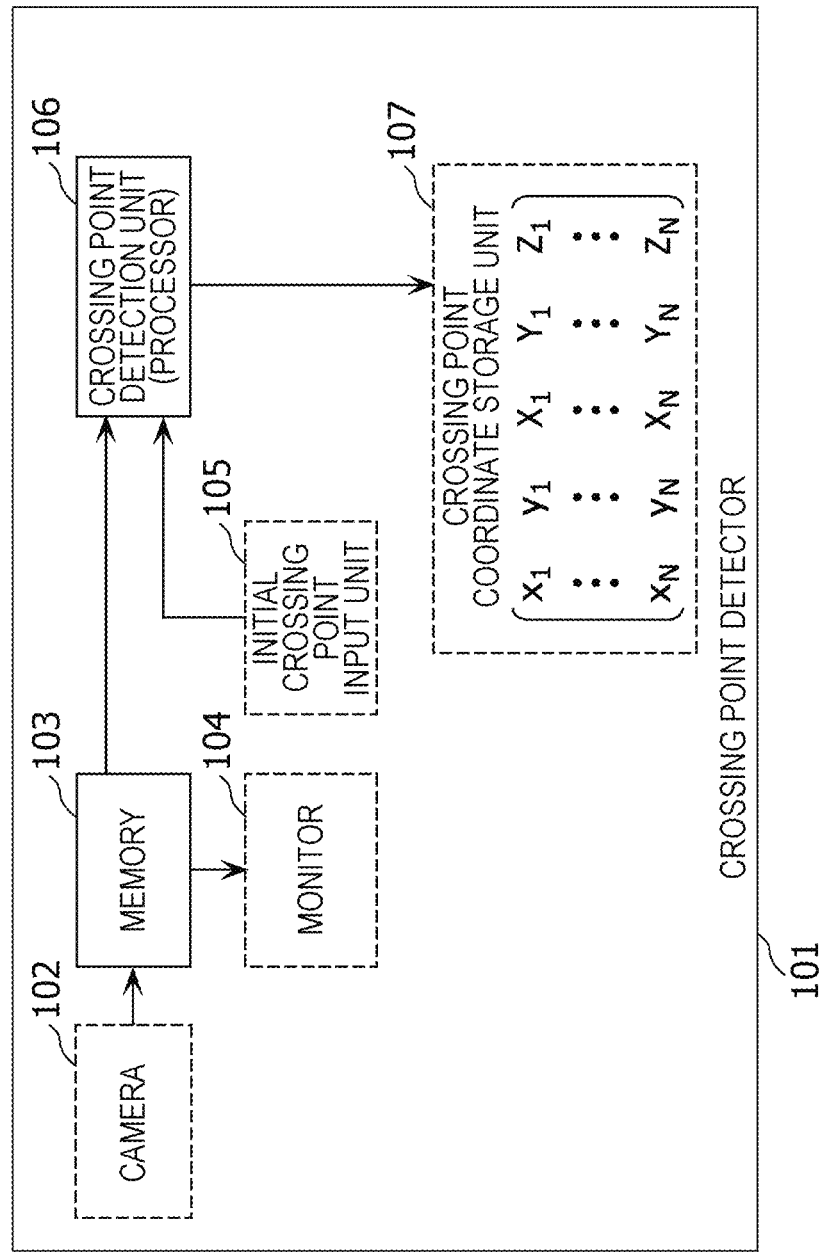
FIG. 1 is a block diagram of a crossing point detector according to Embodiment 1.

DETAILED DESCRIPTION (Underlying Knowledge Forming Basis of the Present Disclosure)

The inventor discovered the following problem related to Japanese Unexamined Patent Application Publication Nos. 2011-188083, 2015-007866, 2014-230215, 2014-035196, and 10-155091, and Japanese Patent Nos. 5432835 and 4825980 described in the section "Background Art".

For example, an operator reads the positions of crossing points in the checker pattern depicted in a captured image, or in other words, the positions of crossing points in an image coordinate system that takes the upper-left of the captured image as the origin. Subsequently, the operator obtains the positions in a three-dimensional coordinate system corresponding to the crossing points from the checker pattern used for imaging. Herein, the checker pattern is drawn on the inside of a box-shaped object. In the checker pattern, square regions with a black color (hereinafter designated black regions) and square regions with a white color (hereinafter designated white regions) are arranged alternately in the horizontal direction and the vertical direction, for example. In such a checker pattern, there are multiple boundary lines between the black regions and the white regions, and two of these boundary lines intersect at a crossing point. Herein, the origin of the world coordinate system (namely, a three-dimensional coordinate system) is defined at a specific position, and the three axes of an X-axis, a Y-axis, and a Z-axis are defined. With this arrangement, the position in the three-dimensional coordinate system of a crossing point of interest can be identified by counting the number of crossing points from the origin.

However, since the precision of the positions of crossing points read by an operator is low, Japanese Unexamined Patent Application Publication Nos. 2011-188083, 2015-007866, 2014-230215, 2014-035196, and 10-155091, and Japanese Patent Nos. 5432835 and 4825980 propose a crossing point detector for raising the precision.

With the crossing point detector of Japanese Unexamined Patent Application Publication No. 2011-188083, a function expressing a sinusoidal curved surface is used to attempt high-precision detection of crossing points in a checker pattern. However, this requires prior knowledge of the periodicity of the checker pattern in the captured image (that is, the periodicity of the lattice pattern in which black regions and white regions are alternately arranged). Also, the difference between the function shape and the lattice pattern as well as the error of the periodicity for both affect the crossing point detection precision. Also, the crossing point detector of Japanese Unexamined Patent Application Publication No. 2011-188083 cannot be applied to a checker pattern that includes edges (that is, boundary lines) along directions other than the horizontal direction and the vertical direction.

With the crossing point detector of Japanese Unexamined Patent Application Publication No. 2015-007866, a positive image and a negative image of a Gray code pattern are imaged, two spatial code images are created from the captured images, and crossing points in the luminance profiles for the positive image and the negative image are acquired as boundary coordinates. However, this crossing point detector computes crossing points from luminance gradient vectors in captured images of a checker pattern, and thus is affected by aliasing produced in pixels at the edges.

With the crossing point detector of Japanese Unexamined Patent Application Publication No. 2014-230215, binary templates corresponding to the inclination of straight lines in a checker pattern are used to detect crossing points. However, the detection of crossing points with binary templates is affected by noise and aliasing. Also, a large number of templates become required to conduct crossing point detection with subpixel precision.

With the crossing point detectors of Japanese Unexamined Patent Application Publication Nos. 2014-035196 and 10-155091, straight line detection results by the Hough transform are used to detect crossing points in a checker pattern. However, the detection of crossing points with the Hough transform is affected by aliasing when the boundary lines of the checker pattern are tilted.

With the crossing point detector of Japanese Patent No. 5432835, camera calibration is conducted on the basis of the detection results of crossing points in a checker pattern by the Harris corner detector. The Harris corner detector detects crossing points with a differential (numerical difference) operator, and thus is affected by noise, and is weak to the effects of aliasing.

With the crossing point detector of Japanese Patent No. 4825980, an LK operator detects crossing points from a checker pattern, and calibration of a stereo fisheye lens camera is conducted. However, the detection of crossing points with a differential (numerical difference) operator is affected by noise, and is weak to the effects of aliasing.

Meanwhile, in order to mount a stereo camera or a multi-lens camera onto a mobile object such as a vehicle or a drone, it is desirable to miniaturize the overall device such as a multi-lens camera. This miniaturization requires shortening the length of the base line, which is the line segment joining the centers of the lenses of two adjacent cameras included in a multi-lens camera, or shortening the interval between the two adjacent cameras. However, since shortening the length of the base line or the interval between camera leads to lowered ranging precision, it is necessary to increase the precision of calibration.

Also, with these stereo cameras or multi-lens cameras, a captured image with a wide field of view is acquired with a fisheye lens or the like. As a result, the checker pattern with a known position in the three-dimensional coordinate system which is being depicted in the captured image used for calibration tilts obliquely at the periphery of the field of view (that is, at the periphery of the captured image). Consequently, it is necessary to accurately detect the crossing points from a checker pattern that includes edges along directions other than the horizontal direction and the vertical direction, while being minimally affected by noise such as aliasing.

However, even with any of the crossing point detectors of Japanese Unexamined Patent Application Publication Nos. 2011-188083, 2015-007866, 2014-230215, 2014-035196, and 10-155091, and Japanese Patent Nos. 5432835 and 4825980 described above, such aliasing effects make it challenging to detect the crossing points of a checker pattern accurately. Consequently, even if crossing points detected in this way are used in the camera calibration method cited above (Roger Y. Tsai, "A versatile camera calibration technique for high-accuracy 3D machine vision metrology using off-the-shelf TV cameras and lenses", IEEE Journal of Robotics and Automation, Vol. 3, pp. 323-344, 1987), there is an issue of being unable to calibrate the camera parameters accurately.

To address such issues, an objective of a crossing point detector according to one aspect of the present disclosure is to detect crossing points with high precision, even from a checker pattern that includes edges along directions other than the horizontal direction and the vertical direction, in order to increase the precision of calibration.

Namely, a crossing point detector according to one aspect of the present disclosure includes a memory that stores a captured image obtained by imaging a checker pattern, and a processor that reads out at least a partial image of the captured image from the memory as an image to process, and detects a crossing point of two boundary lines in the checker pattern depicted in the image to process. Each of the two boundary lines is a boundary line between a first region made up of multiple pixels having a first pixel value and a second region made up of multiple pixels having a second pixel value greater than the first pixel value in the image to process. The processor decides multiple parameters of a function model that treats two-dimensional image coordinates as variables, the parameters being parameters for optimizing an evaluation value based on a difference between respective pixel values represented by the function model and respective pixel values in the image to process, and computes a position of a crossing point of two straight lines expressed by the decided multiple parameters, and thereby detects with subpixel precision the crossing point of the two boundary lines in the image to process. The function model uses a curved surface that is at least first-order differentiable to express the first region and the second region in a two-dimensional coordinate system, and also pixel values at respective positions in the two-dimensional coordinate system at a boundary between the first region and the second region.

With this arrangement, there are decided multiple parameters of a function model that treats two-dimensional image coordinates as variables, the parameters being parameters for optimizing an evaluation value based on the difference between respective pixel values represented by the function model and respective pixel values in an image to process, and crossing points are computed on the basis of the multiple parameters. Consequently, by optimizing the evaluation value, the function model that treats two-dimensional image coordinates as variables can be matched to a pattern being depicted in the image to process. As a result, even if the checker pattern is rotated, or in other words, even if the boundary lines of the checker pattern being depicted in the image to process are tilted, a function model that expresses the tilted boundary lines appropriately can be generated. Since the boundary lines are expressed appropriately by the multiple parameters of the function model generated in this way, a crossing point of two boundary lines can be detected with high precision.

In addition, since the function model uses a curved surface that is at least first-order differentiable to express pixel values at respective positions in a two-dimensional coordinate system at the boundaries between a first region, which is a black region, for example, and a second region, which is a white region, for example, aliasing can be expressed appropriately. Consequently, crossing points can be detected with high precision, even from a checker pattern that includes edges along directions other than the horizontal direction and the vertical direction.

Furthermore, since pixel values are expressed by a curved surface that is at least first-order differentiable, a gradient method can be used to optimize the evaluation value simply, potentially reducing the computational cost.

Furthermore, since the crossing points of a checker pattern can be detected with high precision, it is possible to increase the precision of calibration that associates the positions of the crossing points of a checker pattern in a three-dimensional coordinate system with the positions of the crossing points in a captured image.

For example, the function model may be made up of a logistic function expanded in two dimensions. Specifically, the multiple parameters of the function model may include angles $\theta$ and $\varphi$, pixel values a and d, distances b and c, and a degree of image blur $\sigma$, and the function model may use two straight lines in a two-dimensional coordinate system made from an x-axis and a y-axis, namely $(x \cos \theta + y \sin \theta + b) = 0$ and $(x \sin \varphi - y \cos \varphi + c) = 0$, to express a pixel value $M(x, y)$ at a position $(x, y)$ in the two-dimensional coordinate system according to the following formula:

$$M(x, y) = \frac{a}{1 + \exp\left(\frac{(x\cos\theta + y\sin\theta + b)(x\sin\phi - y\cos\phi + c)}{\sigma}\right)} + d$$

With this arrangement, since a logistic function expresses a curve along a direction that cuts across a boundary between a first region and a region included on the curved surface described above as a point-symmetric curve, aliasing can be expressed more appropriately. Consequently, crossing points can be detected with high precision, even from a checker pattern that includes edges along directions other than the horizontal direction and the vertical direction.

Also, a crossing point detector according to one aspect of the present disclosure includes a memory that stores a captured image obtained by imaging a checker pattern, and a processor that reads out at least a partial image of the captured image from the memory as an image to process, and detects a crossing point of two boundary lines in the checker pattern depicted in the image to process. Each of the two boundary lines is a boundary line between a first region made up of multiple pixels having a first pixel value and a second region made up of multiple pixels having a second pixel value greater than the first pixel value in the image to process. The processor decides multiple parameters of a numerical model, the parameters being parameters for optimizing an evaluation value based on a difference between respective pixel values represented by the function model and respective pixel values in the image to process, and computes a position of a crossing point of two straight lines expressed by the decided multiple parameters, and thereby detects with subpixel precision the crossing point of the two boundary lines in the image to process. The numerical model is a model that simulates a pixel integration effect when imaging a step edge by assigning pixel values to respective regions inside a pixel divided by a straight line, and deciding a pixel value of the overall pixel. For example, the processor, when deciding the multiple parameters of the numerical model, may generate multiple subpixels by oversampling a pixel, divide the pixel into multiple regions with a straight line expressed by the multiple parameters, assign a subpixel value expressed by the multiple parameters to each subpixel included in each of the multiple regions, and compute a pixel value expressed by the numerical model by numerically integrating the subpixel values over the range of the pixel.

With this arrangement, there are decided multiple parameters of a numerical model, the parameters being parameters for optimizing an evaluation value based on the difference between respective pixel values represented by the numerical model and respective pixel values in an image to process, and crossing points are computed on the basis of the multiple parameters. Consequently, by optimizing the evaluation value, the numerical model can be matched to a pattern being depicted in the image to process. As a result, even if the checker pattern is rotated, or in other words, even if the boundary lines of the checker pattern being depicted in the image to process are tilted, a numerical model that expresses the tilted boundary lines appropriately can be generated. Since the boundary lines are expressed appropriately by the multiple parameters of the numerical model generated in this way, a crossing point of two boundary lines can be detected with high precision.

Also, the numerical model is a model that simulates a pixel integration effect when imaging a step edge by assigning pixel values to respective regions inside a pixel divided by a straight line, and deciding the pixel value of the overall pixel. For this reason, aliasing can be reproduced more appropriately. Consequently, crossing points can be detected with high precision, even from a checker pattern that includes edges along directions other than the horizontal direction and the vertical direction.

Furthermore, since the crossing points of a checker pattern can be detected with higher precision, it is possible to increase further the precision of calibration that associates the positions of the crossing points of a checker pattern in a three-dimensional coordinate system with the positions of the crossing points in a captured image.

Also, the processor may additionally decide multiple parameters of a function model that treats two-dimensional image coordinates as variables, the parameters being parameters for optimizing an evaluation value based on a difference between respective pixel values represented by the function model and respective pixel values in the image to process, and compute a position of a crossing point of two straight lines expressed by the decided multiple parameters as a first initial position. The function model may use a curved surface that is at least first-order differentiable to express the first region and the second region in a two-dimensional coordinate system, and also pixel values at respective positions in the two-dimensional coordinate system at a boundary between the first region and the second region. The processor, when deciding the multiple parameters of the numerical model, may optimize the evaluation value while changing the position of the crossing point of the two straight lines expressed by the multiple parameters of the numerical model from the first initial position.

With this arrangement, a coarse-to-fine search of crossing points of a checker pattern can be conducted. In other words, by using a function model to detect the rough position of a crossing point as a first initial position, and additionally using a numerical model to search for a crossing point from the first initial position, a crossing point of a checker pattern can be detected. Crossing point detection using a function model has a low computational cost, but the crossing point detection precision is lower than crossing point detection using a numerical model. Conversely, crossing point detection using a numerical model has a high computational cost, but the crossing point detection precision is higher than crossing point detection using a function model. Consequently, by conducting the coarse-to-fine search described above, a favorable balance between reducing the computational cost and improving the detection precision can be achieved.

Also, the crossing point detector additionally may include a display that displays the captured image. The processor may acquire a position on the displayed captured image in accordance with an operation performed by an operator as a second initial position, and read out, from the memory, a region including the second initial position from the captured image as the image to process.

With this arrangement, in a case in which the position of a crossing point read by an operator is acquired as a second initial position by an operation performed by the operator, the crossing point is included in an image to process that includes the second initial position. Consequently, it is possible to reduce the occurrence of false positives, in which a crossing point is incorrectly detected even though a crossing point does not exist in the image to process.

Also, the processor additionally may generate multiple predetermined initial crossing points, and sequentially select one of the multiple initial crossing points as a selected initial crossing point. In the reading out of the image to process, every time the selected initial crossing point is selected, the processor may read out an image to process that includes the position of the selected initial crossing point. In the detecting of the crossing point with subpixel precision, in a case in which the optimized evaluation value is less than a threshold value, the processor may detect with subpixel precision the crossing point of the two boundary lines inside the image to process on a basis of the multiple parameters.

With this arrangement, images to process are successively read out automatically, without requiring operations by the operator, and if a crossing point exists in the image to process, the crossing point can be detected with high precision.

Also, a camera calibration system according to an aspect of the present disclosure includes the crossing point detector described above, and a computation unit that uses a crossing point detected by the crossing point detector to compute camera parameters of a camera used to image the checker pattern.

With this arrangement, camera parameters can be computed and calibrated with high precision.

A coordinate position determiner according to one aspect of the present disclosure includes a memory that stores an image obtained by imaging a checker pattern, the checker pattern including a first crossing point of a first line and a second line, and a processor that reads out the image from memory and determines coordinate position of a second crossing point, in a two-dimensional coordinate system, indicating a crossing point in the image that corresponds to the first crossing point, wherein provided that a position of each pixel in the image is expressed by coordinate position $(x_k, y_k)$ in the two-dimensional coordinate system, a pixel value at the coordinate position $(x_k, y_k)$ in the image is $I(x_k, y_k)$, where k is a natural number less than or equal to n, and n is a total number of pixels included in the image, the second crossing point is a crossing point of a first boundary line and a second boundary line, the first boundary line being located on a boundary between a region that includes a first region included in the image and a second region included in the image, and a region that includes a third region included in the image and a fourth region included in the image, and the second boundary line being located on a boundary between a region that includes the first region and the third region, and a region that includes the second region and the fourth region, each pixel value of the pixels included in the first and fourth regions is greater than each pixel value of the pixels included in the second and third regions, the processor decides parameters of $M(x, y)$ that optimize an evaluation value based on a difference between $M(x=x_k, y=y_k)$ and $I(x_k, y_k)$, $M(x, y)$ indicates a pixel value at the coordinate position $(x, y)$ in the two-dimensional coordinate system, the processor computes the position of the crossing point of the first boundary line and the second boundary line expressed by using the multiple parameters to thereby obtain the second crossing point with a precision by which a resolution in an x-axis direction of the two-dimensional coordinate system is less than $(x_{k+1}-x_k)$ and a resolution in a y-axis direction of the two-dimensional coordinate system is less than $(y_{k+1}-y_k)$, and $M(x, y)$ uses a curved surface that is at least first-order differentiable to express the first region, the second region, the third region, and the fourth region in the two-dimensional coordinate system, and pixel values at respective positions in the two-dimensional coordinate system on the first boundary line and the second boundary line.

With this arrangement, the detection precision of crossing points in a checker pattern can be improved.

Hereinafter, embodiments will be described specifically with reference to the drawings.

Note that the exemplary embodiments described hereinafter all illustrate general or specific examples. Features such as numerical values, shapes, materials, structural elements, layout positions and connection states of structural elements, steps, and the ordering of steps indicated in the following exemplary embodiments are merely examples, and are not intended to limit the present disclosure. In addition, among the structural elements in the following exemplary embodiments, structural elements that are not described in the independent claim indicating the broadest concept are described as arbitrary or optional structural elements.

Also, each diagram is a schematic diagram, and does not necessarily illustrate a strict representation. Also, in each diagram, like component members are denoted with like reference signs.

Embodiment 1

[Function Model]

FIG. 1 is a block diagram of a crossing point detector according to Embodiment 1. As illustrated in FIG. 1, a crossing point detector 101 according to the present embodiment is provided with a camera 102, memory 103, a monitor 104, an initial crossing point input unit 105, a crossing point detection unit 106, and a crossing point coordinate storage unit 107. Note that in the present embodiment, the crossing point detector 101 is provided with the camera 102, the monitor 104, the initial crossing point input unit 105, and the crossing point coordinate storage unit 107, but these component elements may also not be provided. In addition, the crossing point detection unit 106 according to the present embodiment is made up of at least one processor, for example.

Hereinafter, the operation of each component element included in the crossing point detector 101 will be described.

The camera 102 images a photographic subject that includes a checker pattern.

The memory 103 stores the captured image obtained by the imaging of the checker pattern. In other words, the memory 103 stores an image captured by the camera 102.

The monitor 104 is a display unit that displays a captured image obtained by imaging. When the captured image is displayed, an operator reads the coordinates of a crossing point in the captured image with pixel precision. The crossing point is a crossing point of two boundary lines in the checker pattern depicted in the captured image.

The initial crossing point input unit 105 receives, in accordance with an operation by the operator, the coordinates of a crossing point read by the operator, and outputs to the crossing point detection unit 106.

The crossing point detection unit 106 reads out at least a partial image of the captured image from the memory 103 as an image to process, and detects a crossing point of two boundary lines in the checker pattern depicted in the image to process. Note that each of the two boundary lines is a boundary line between a first region made up of multiple pixels having a first pixel value and a second region made up of multiple pixels having a second pixel value greater than the first pixel value in the image to process. The first region is a region having a black color, for example, while the second region is a region having a white color, for example.

Specifically, the crossing point detection unit 106 decides multiple parameters of a function model that treats two-dimensional image coordinates as variables, the parameters being parameters for optimizing an evaluation value based on the difference between respective pixel values represented by the function model and respective pixel values in the image to process. Subsequently, the crossing point detection unit 106 computes the position of a crossing point of two straight lines expressed by the decided multiple parameters, and thereby detects with subpixel precision the crossing point of two boundary lines in the image to process. Herein, the function model described above uses a curved surface that is at least first-order differentiable to express the first region and the second region in a two-dimensional coordinate system, as well as the pixel values at respective positions in the two-dimensional coordinate system at the boundaries between the first region and the second region. Also, the function model is made up of a logistic function expanded in two dimensions, for example. Note that in the present embodiment, the image to process is a square image, for example.

In other words, the crossing point detection unit 106 fits a function model to a checker pattern depicted in a square image, namely, the image to process read out from the memory 103. By fitting the function model, the position of a crossing point can be detected with subpixel precision, even from a checker pattern that includes edges in directions other than the horizontal direction and the vertical direction.

Note that fitting the function model refers to deciding multiple parameters of the function model for optimizing the evaluation value described above. The crossing point detection unit 106 decides the multiple parameters of the function model for optimizing the evaluation value while changing the multiple parameters of the function model, or in other words, while changing the position of the crossing point of the two straight lines described above from the position (that is, the coordinates) of an initial crossing point.

Also, when reading out a square image from the memory 103, the crossing point detection unit 106 first acquires the coordinates of an initial crossing point output from the initial crossing point input unit 105 (in other words, a second initial position). In other words, the crossing point detection unit 106 acquires a position in the captured image being displayed in accordance with an operation by the operator as the second initial position. Subsequently, the crossing point detection unit 106 reads out from the memory 103 a region including the second initial position from the captured image as the square image (that is, the image to process). Specifically, the crossing point detection unit 106 reads out from the memory 103 a square image that is centered on the position of the initial crossing point.

The crossing point coordinate storage unit 107 stores the position (xn, yn) of the crossing point detected by the crossing point detection unit 106 in association with the position (Xn, Yn, Zn) of a known crossing point of the checker pattern in a three-dimensional coordinate system corresponding to the detected crossing point.

Figure 2:
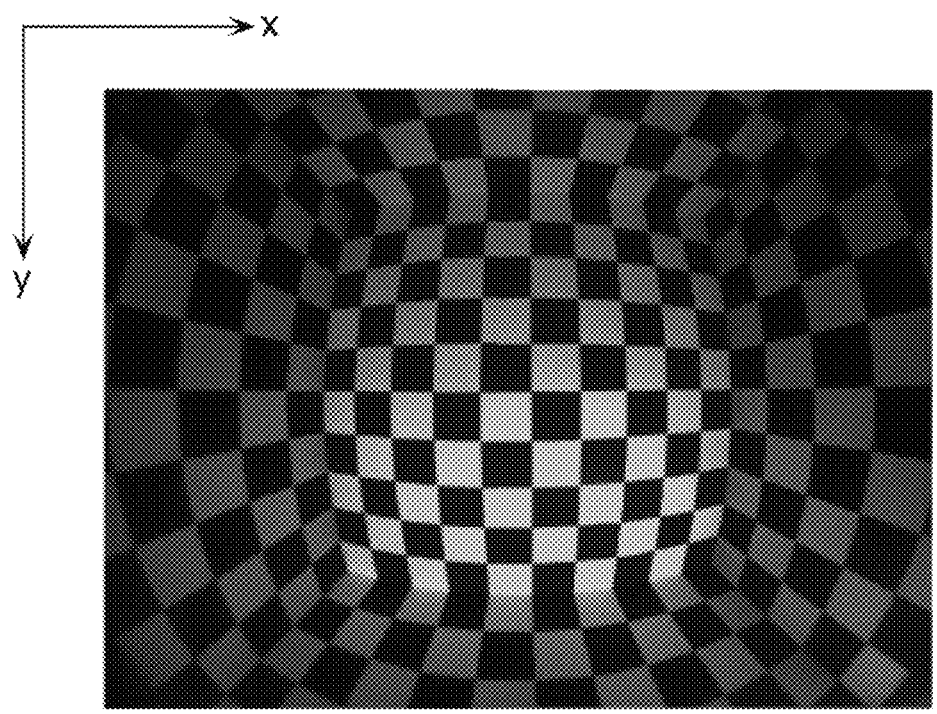
FIG. 2 is a diagram illustrating an example of a captured image of a checker pattern according to Embodiment 1.

FIG. 2 is a diagram illustrating an example of a captured image of a checker pattern.

The camera 102 images the checker pattern with a fisheye lens. The monitor 104 displays the captured image obtained by the imaging as illustrated in FIG. 2. The checker pattern is a pattern drawn on the inside of a box-shaped object. In the checker pattern, square regions with a black color (that is, black regions) and square regions with a white color (that is, white regions), each being the same size, are arranged alternately in the horizontal direction and the vertical direction. Consequently, in the checker pattern, there are multiple boundary lines between the black regions and the white regions, and two of these boundary lines intersect at a crossing point. Accordingly, by defining the origin of the world coordinate system at a specific position in space, and by defining the three axes of an X-axis, a Y-axis, and a Z-axis, the position of the crossing point in the world coordinate system (that is, a three-dimensional coordinate system) can be identified.

The operator reads the position of a crossing point in the captured image being displayed as coordinates in an image coordinate system (also called a two-dimensional coordinate system) in which the origin is set to the upper-left. Subsequently, the initial crossing point input unit 105 receives the position of the crossing point read in accordance with an operation by the operator as the position of the initial crossing point. In other words, the operator gives the position of the initial crossing point to the crossing point detector 101 through the initial crossing point input unit 105. Additionally, the initial crossing point input unit 105 receives the position of a known crossing point of the checker pattern in the three-dimensional coordinate system corresponding to the read crossing point in accordance with an operation by the operator. Subsequently, the initial crossing point input unit 105 outputs the read position of the crossing point and the position of the known crossing point in the three-dimensional coordinate system to the crossing point detection unit 106.

Figure 3:
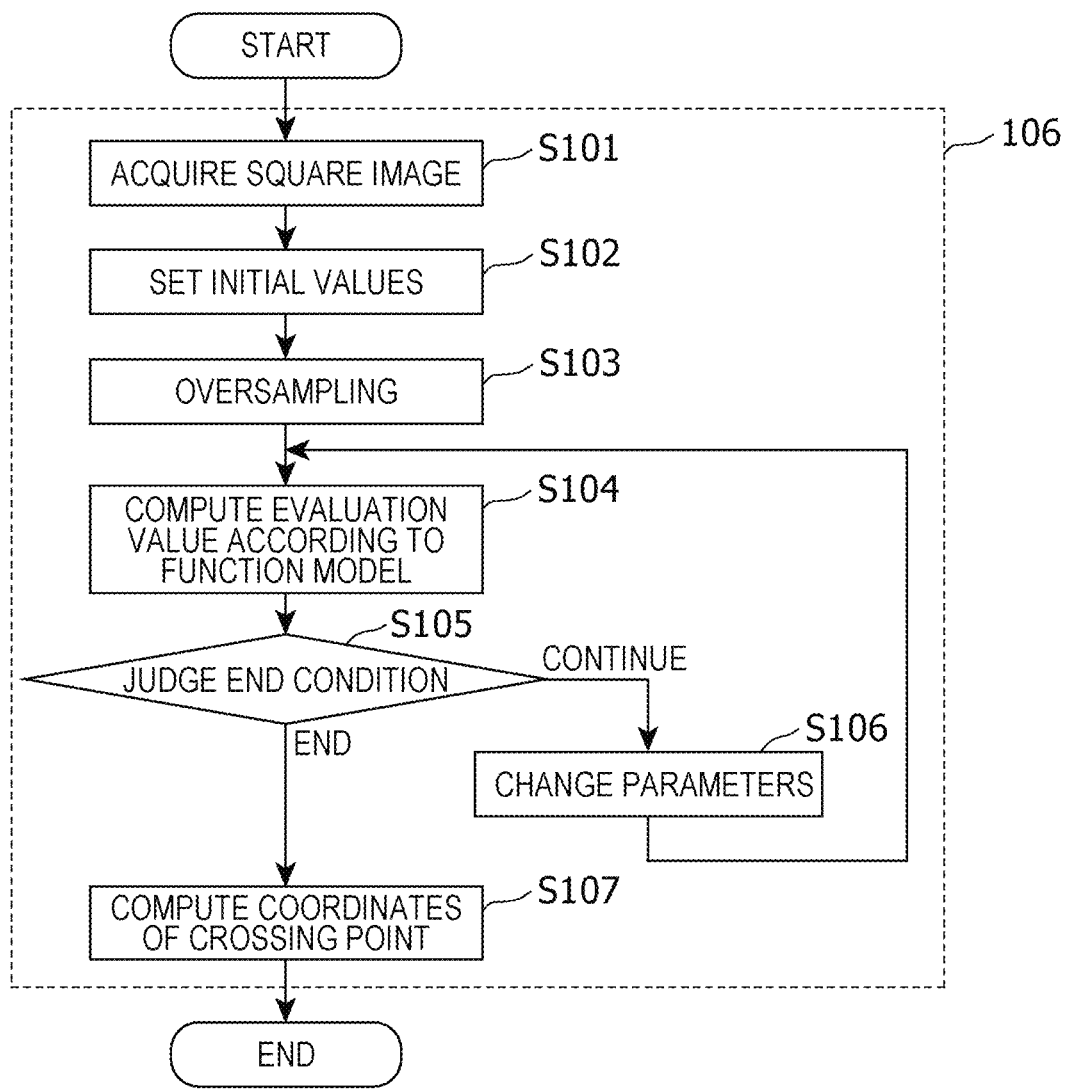
FIG. 3 is a flowchart illustrating operation of a crossing point detection unit according to Embodiment 1.

FIG. 3 is a flowchart illustrating operation of the crossing point detection unit 106 according to the present embodiment.

The crossing point detection unit 106 acquires a square image centered on the position of the initial crossing point given by the operator (step S101). Next, on the basis of the position of the initial crossing point, the crossing point detection unit 106 sets initial values of multiple parameters (a, b, c, d, θ, φ, σ) of the function model required for crossing point detection (step S102). Next, the crossing point detection unit 106 oversamples the square image, and applies a Gaussian filter (step S103). For example, the crossing point detection unit 106 applies a Gaussian filter to the pixel value I(x, y) of the position (x, y) in the image coordinate system in the square image. With this arrangement, the crossing point detection unit 106 transforms the pixel value I(x, y) to a pixel value I'(x, y) to which the Gaussian filter has been applied, as indicated in (Formula 1) below. Note that in the example illustrated in FIG. 3, oversampling and a Gaussian filter are applied, but the application of the above is arbitrary, and the above may also not be applied.

$$I'(x, y) = G(x, y) * I(x, y) \quad (1)$$
$$G(x, y) = \frac{1}{2\pi\sigma_G^2} \exp\left(-\frac{x^2 + y^2}{\sigma_G}\right)$$

Herein, in the Gaussian filter of (Formula 1) above, * indicates convolution, while $\sigma_G$ indicates the degree of image blur.

Next, the crossing point detection unit 106 evaluates the matching between the square image and the function model (step S104). In other words, the crossing point detection unit 106 computes the evaluation value described above. The function model is a function M(x, y) that treats the two-dimensional image coordinates (x, y) as variables, and is a two-dimensional expansion of the exponent of a logistic function, as indicated in (Formula 2) below, for example.

$$M(x, y) = \frac{a}{1 + \exp\left(\frac{(x\cos\theta + y\sin\theta + b)(x\sin\phi - y\cos\phi + c)}{\sigma}\right)} + d \quad (2)$$

Herein, (a+d) indicates the white level, while d indicates the black level. x cos θ+y sin θ+b (=0) and x sin φ−y cos φ+c (=0) respectively indicate two straight lines, while σ indicates the degree of image blur.

In other words, in the present embodiment, the multiple parameters of the function model include the angles θ and φ, the pixel values a and d, the distances b and c, and the degree of image blur σ. Additionally, the function model uses the two straight lines in the two-dimensional coordinate system made from the x-axis and the y-axis, namely (x cos θ+y sin θ+b)=0 and (x sin φ−y cos φ+c)=0, to express the pixel value M(x, y) at the position (x, y) in the two-dimensional coordinate system with (Formula 2) above.

Figure 4:
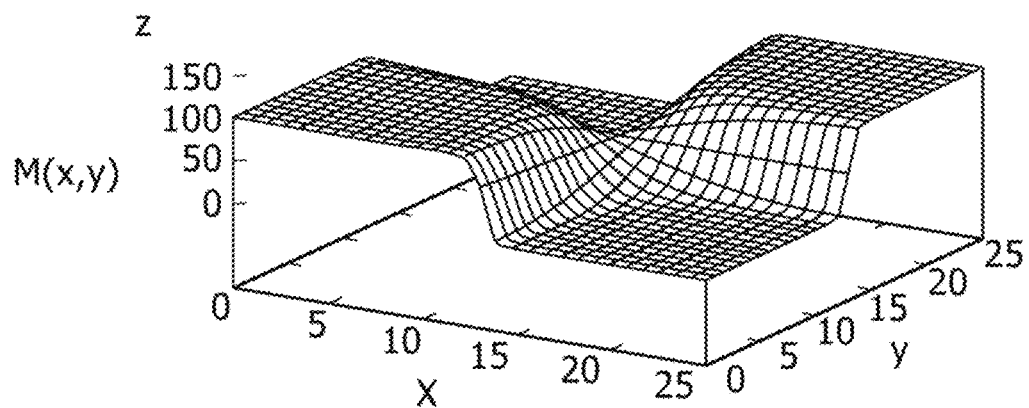
FIG. 4 is a diagram illustrating an outline of a function model according to Embodiment 1.

FIG. 4 is a diagram illustrating an outline of the function M(x, y).

As illustrated in FIG. 4, the function M(x, y) expresses a first region indicating a black level and a second region indicating a white level in the two-dimensional coordinate system, and in addition, expresses the pixel value of each position in the two-dimensional coordinate system at the boundary between the first region and the second region with a curved surface that is at least first-order differentiable.

The crossing point detection unit 106 compares the pixel value of the square image to the pixel value of the function M(x, y), and evaluates the fitness (matching) of the function model to the checker pattern in the square image by the residual sum of squares. In other words, the crossing point detection unit 106 evaluates the fitness of the function model with the evaluation value J indicated in (Formula 3) below.

$$J = \sum_{k=1}^{N} \left( \frac{a}{1 + \exp\left( \frac{(x_k \cos\theta + y_k \sin\theta + b)}{\sigma}(x_k \sin\phi - y_k \cos\phi + c)} \right)} + d - I(x_k, y_k) \right)^2 \quad (3)$$

Herein, in (Formula 3) above, N indicates the number of pixels being compared, while I(xk, yk) indicates the pixel value of the kth pixel (that is, the pixel at the coordinates (xk, yk)) in the square image. In the case of applying a Gaussian filter, the pixel value I'(xk, yk) to which the Gaussian filter has been applied is used instead of the pixel value I(xk, yk). Also, these pixel values are RGB values or luminance values, for example.

After the evaluation value is computed, the crossing point detection unit 106 determines whether or not an end condition of the computation is satisfied (step S105). For example, in the case in which the computed evaluation value J is less than a threshold value, the crossing point detection unit 106 determines that the end condition is satisfied (step S105, End), whereas in the case in which the evaluation value J is equal to or greater than the evaluation value, the crossing point detection unit 106 determines that the end condition is not satisfied (step S105, Continue). Note that such a threshold value is decided empirically in accordance with the noise in the image. Alternatively, in the case in which the number of repetitions of the computation of the evaluation value J is greater than a threshold value, the crossing point detection unit 106 determines that the end condition is satisfied (step S105, End), whereas in the case in which the number of repetitions is less than or equal to the threshold value, the crossing point detection unit 106 determines that the end condition is not satisfied (step S105, Continue). Note that such a threshold value of the number of repetitions is a value such as 100 times, for example.

Here, in the case of determining in step S105 that the end condition is not satisfied (step S105, Continue), the crossing point detection unit 106 changes the value of at least one from among the multiple parameters b, c, θ, φ, and σ of the function M(x, y) (step S106). At this time, the crossing point detection unit 106 may also change the position of the crossing point of the two straight lines expressed by these parameters. Note that the initial value of the position of the crossing point is the position of the initial crossing point described above (that is, the second initial position). Subsequently, the crossing point detection unit 106 repeats the computation of the evaluation value J of the function M(x, y) based on the changed multiple parameters (step S104).

Also, in the case in which the parameters b, c, θ, φ, and σ are given, the parameters a and d that minimize the evaluation value J are found analytically as the solution to the simultaneous equations in (Formula 4) below.

$$\begin{pmatrix} \sum_{k=1}^{N} \frac{1}{A^2} & \sum_{k=1}^{N} \frac{1}{A} \\ \sum_{k=1}^{N} \frac{1}{A} & N \end{pmatrix} \begin{pmatrix} a \\ d \end{pmatrix} = \begin{pmatrix} \sum_{k=1}^{N} \frac{I(x_k, y_k)}{A} \\ \sum_{k=1}^{N} I(x_k, y_k) \end{pmatrix} \quad (4)$$

where $$A = 1 + \exp\left( \frac{(x_k \cos\theta + y_k \sin\theta + b)(x_k \sin\phi - y_k \cos\phi + c)}{\sigma} \right)$$

Also, in step S105, in the case in which the end condition is satisfied, the evaluation value J is in an optimized state. This optimized evaluation value J is also considered to be substantially minimized. In other words, by the processes from steps S104 to S106, the crossing point detection unit 106 searches for multiple parameters of the function model by which an optimized evaluation value J, or in other words a substantially minimized evaluation value J, is obtained.

In the iterative calculation of step S104, provided that Wx and Wy are the respective numbers of pixels in the landscape direction (horizontal direction) and the portrait direction (vertical direction) of the square image, the initial values of b and c are −Wx/2 and Wy/2, respectively. Also, the two straight lines, namely the straight line expressed by x cos θ+y sin θ+b=0 and the straight line expressed by x sin φ−y cos φ+c=0, intersect in the case of θ=φ. For this reason, the initial values of θ and φ are θ=φ=0°. Additionally, it is sufficient to set the initial value of σ expressing blur to a positive value approximately equal to 1. In other words, in step S102, the crossing point detection unit 106 sets (−Wx/w, Wy/2, 0, 0, 1) as the initial values of the parameters (b, c, θ, φ, σ). Subsequently, in the iterative calculation of step S104, the crossing point detection unit 106 searches for a minimum evaluation value J in the range of ±45° for both θ and φ.

In addition, in step S104, the crossing point detection unit 106 may also determine a minimum evaluation value J in a predetermined numerical range of the above multiple parameters by a gradient method, such as the commonly known method of steepest descent. In this case, in step S106, the crossing point detection unit 106 changes the numerical range of the multiple parameters.

The crossing point detection unit 106 uses each parameter which minimizes the evaluation value J to compute the coordinates P(x, y) of the crossing point of the above two straight lines according to (Formula 5) below (step S107). With this arrangement, a crossing point of the checker pattern depicted in the square image is detected with sub-pixel precision.

$$P\left( \frac{-b\cos\phi - c\sin\theta}{\cos\theta\cos\phi + \sin\theta\sin\phi}, \frac{-b\sin\phi + c\cos\theta}{\cos\theta\cos\phi + \sin\theta\sin\phi} \right) \quad (5)$$

[Crossing Point Detection Precision]

The crossing point detection precision with respect to computer graphics (CG) data using the function model in the present embodiment is described below.

Figure 5:
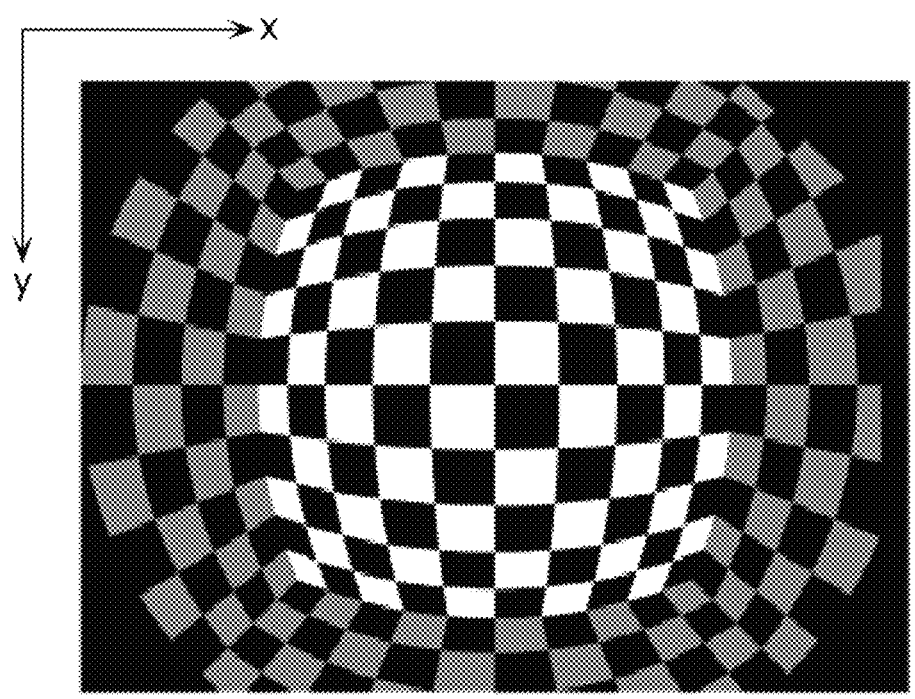
FIG. 5 is a diagram illustrating an example of a captured image made up of CG data.

FIG. 5 is a diagram illustrating an example of a captured image made up of CG data.

For example, a captured image is generated by CG, the captured image being obtained by imaging a certain checker pattern in a world coordinate system with a fisheye lens camera having a 180° horizontal and vertical field of view, and including edges along directions other than the horizontal direction and the vertical direction. Hereinafter, CG data which is a captured image generated by CG is designated a CG captured image. Note that the object on which is drawn the checker pattern is a rectangular cuboid having a horizontal width and a vertical height of 100 cm each, and a depth of 40 cm in the world coordinate system. Additionally, inside the rectangular cuboid, there is drawn a checker pattern made up of multiple white squares each having an edge length of 10 cm (the white regions described above) and multiple black squares each having an edge length of 10 cm (the black regions described above). In this CG captured image, there are 169 crossing points, excluding the crossing point at the image periphery and the crossing points on the edges of the rectangular cuboid.

The positions of the crossing points in the CG captured image are known with decimal precision, and the distance in the image between a known position and the position of a crossing point detected by the crossing point detector 101 according to the present embodiment is defined to be the error.

First, the operator reads the position of a crossing point in the CG captured image. The initial crossing point input unit 105 receives the read position in accordance with an operation performed by the operator, and outputs the position to the crossing point detection unit 106. The crossing point detection unit 106 acquires the position as the position of the initial crossing point to use in the function model. Furthermore, the crossing point detection unit 106 extracts from the CG captured image a square image (that is, a square region) centered on the position of the initial crossing point and having a certain number of pixels on each edge, and uses the function model described above to detect a crossing point included in the square image. The crossing point detection unit 106 uses the function model described above to detect the positions of all 169 crossing points described above which are included in the CG captured image. At this time, the crossing point detection unit 106 applies, to the square image, oversampling by a certain factor (for example, a factor of 10) and a Gaussian filter in the horizontal direction and the vertical direction.

Figure 8:
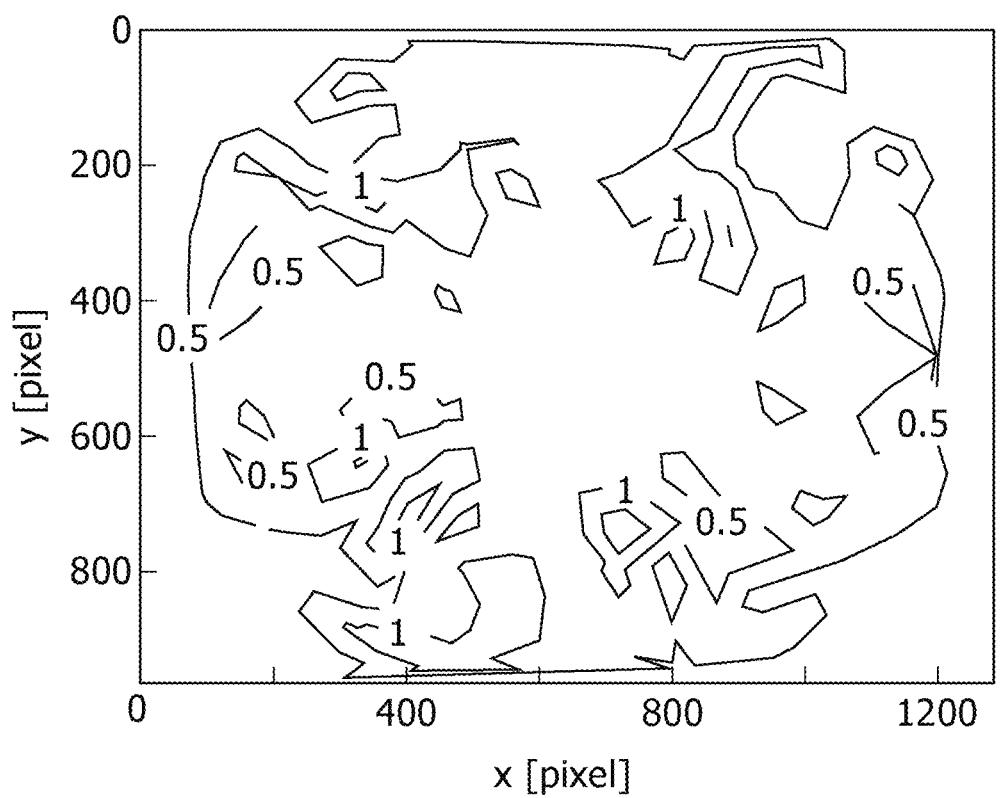
FIG. 8 is an error distribution diagram illustrating the error between the positions of crossing points detected manually by an operator with pixel precision, and the actual positions of crossing points.
Figure 9:
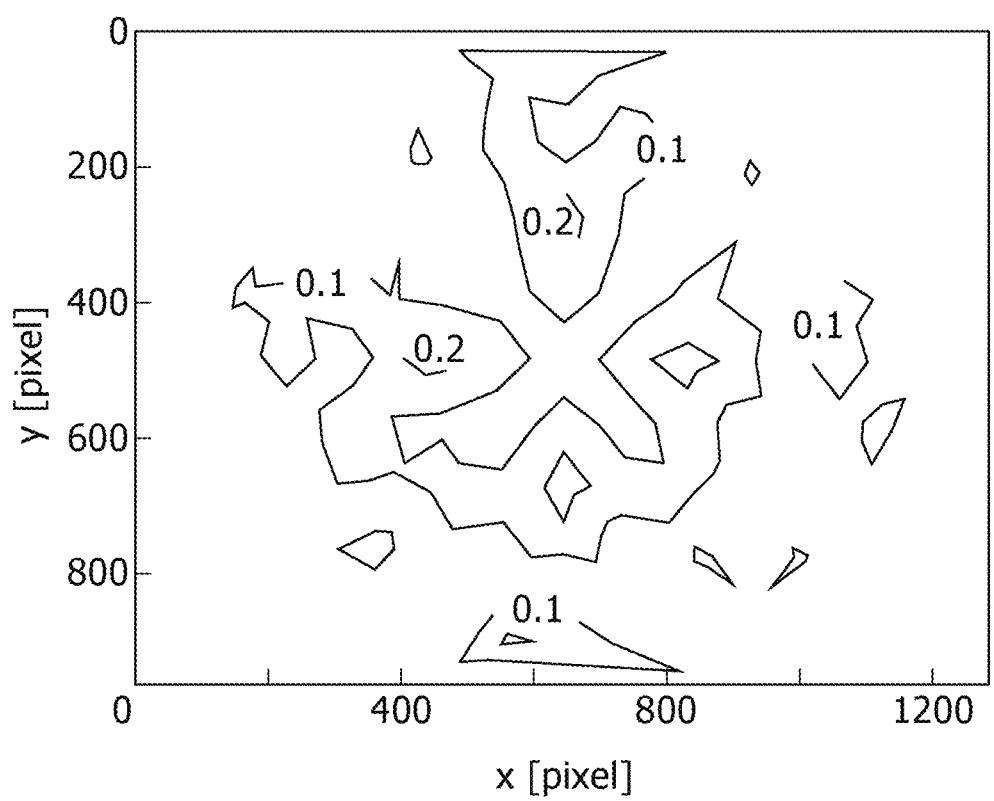
FIG. 9 is an error distribution diagram illustrating the error between the positions of crossing points detected by a crossing point detector using a function model according to Embodiment 1, and the actual positions of crossing points.

FIG. 6 is a diagram illustrating the precision of manual detection of crossing points by an operator with pixel precision. FIG. 7 is a diagram illustrating the detection precision of crossing points by the crossing point detector 101 using a function model according to the present embodiment. Also, FIG. 8 is a contour map in which height is used to illustrate the error between the positions of crossing points detected manually by an operator with pixel precision, and the actual positions of crossing points. FIG. 9 is a contour map in which height is used to illustrate the error between the positions of crossing points detected by the crossing point detector 101 using a function model according to the present embodiment, and the actual positions of crossing points. In other words, these contour maps illustrate error distributions of the positions of crossing points.

As illustrated in FIGS. 6 and 8, since the position of a crossing point read by the operator is an integer value, the quantization error of the position is 0.5 pixels. Also, the operator is unable to accurately select the position of a crossing point of two edges each along directions other than the horizontal direction and the vertical direction. Consequently, the root mean square error is 0.81 pixels, which is larger than the quantization error.

On the other hand, in the crossing point detector 101 using the function model according to the present embodiment, detecting crossing points with subpixel precision is possible. Consequently, as illustrated in FIGS. 7 and 9, in the present embodiment, the root mean square error is 0.10 pixels, which is even lower than the above quantization error of 0.5 pixels, and thus crossing points can be detected with high precision.

Summary of Embodiment 1

The above thus describes the crossing point detector 101 and the crossing point detection method according to Embodiment 1. To summarize, the crossing point detector 101 includes the configuration illustrated in FIG. 10A, and the crossing point detection method is indicated by the flowchart illustrated in FIG. 10B.

Figure 10A:
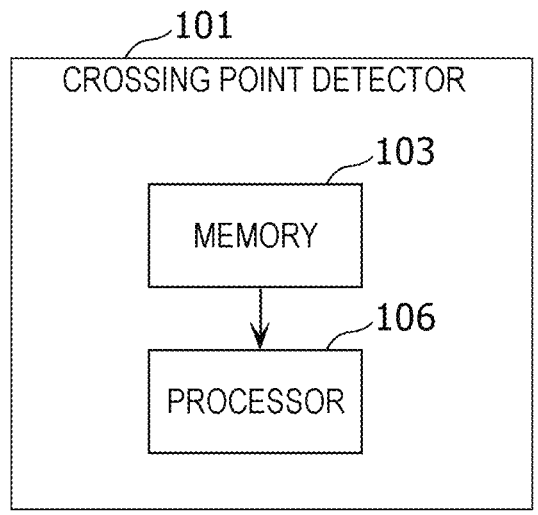
FIG. 10A is a block diagram illustrating a configuration of a crossing point detector according to a first aspect of the present disclosure.

FIG. 10A is a block diagram illustrating a configuration of the crossing point detector 101 according to a first aspect of the present disclosure.

The crossing point detector 101 is provided with memory 103 and a processor 106. The memory 103 stores the captured image obtained by the imaging of a checker pattern. The processor 106 reads out at least a partial image of the captured image from the memory 103 as the image to process. Subsequently, the processor 106 detects a crossing point of two boundary lines in the checker pattern depicted in the image to process.

Herein, each of the two boundary lines is a boundary line between a first region made up of multiple pixels having a first pixel value and a second region made up of multiple pixels having a second pixel value greater than the first pixel value in the image to process. The boundary lines are edges or step edges.

Also, the processor 106 decides multiple parameters of a function model that treats two-dimensional image coordinates as variables, the parameters being parameters for optimizing an evaluation value based on the difference between respective pixel values represented by the function model and respective pixel values in the image to process. Subsequently, the processor 106 computes the position of a crossing point of two straight lines expressed by the decided multiple parameters, and thereby detects with subpixel precision the crossing point of two boundary lines in the image to process.

Herein, the function model uses a curved surface that is at least first-order differentiable to express the first region and the second region in a two-dimensional coordinate system, as well as the pixel values at respective positions in the two-dimensional coordinate system at the boundaries between the first region and the second region.

Figure 10B:
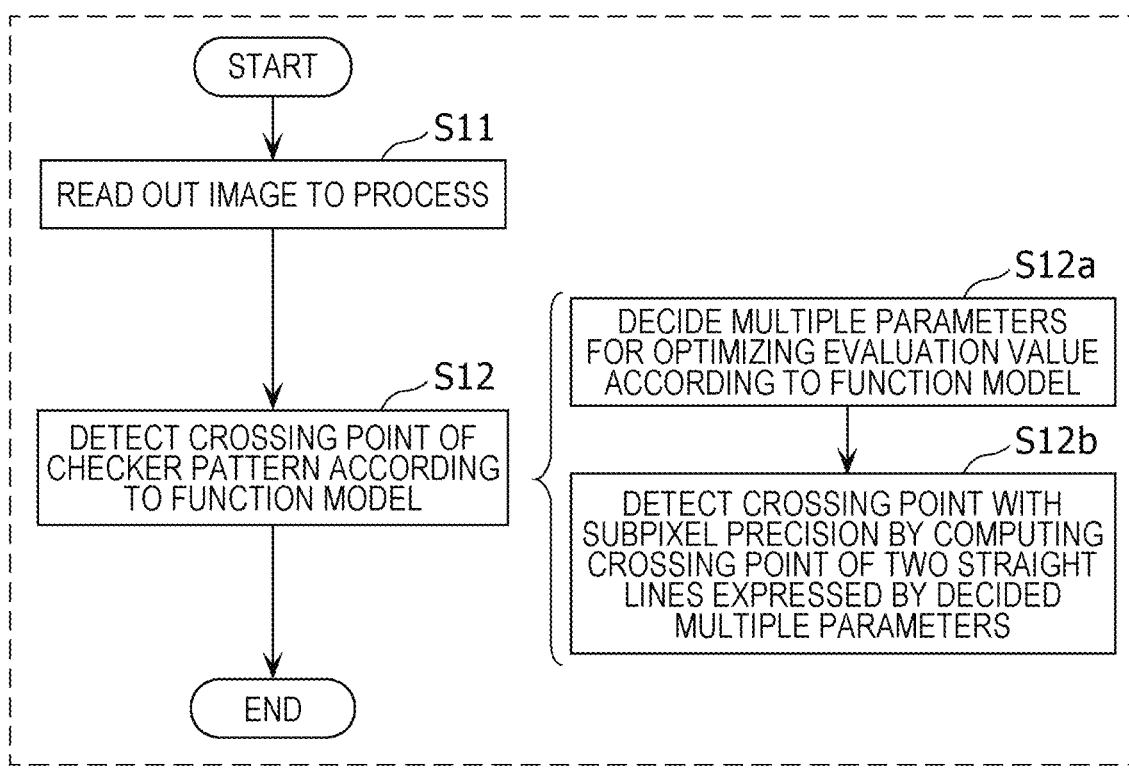
FIG. 10B is a flowchart of a crossing point detection method according to a first aspect of the present disclosure.

FIG. 10B is a flowchart illustrating the crossing point detection method according to the first aspect of the present disclosure.

First, the processor 106 reads out, from the memory 103 storing the captured image obtained by imaging the checker pattern, at least a partial image of the captured image as the image to process (step S11). Subsequently, the processor 106 detects a crossing point of two boundary lines in the checker pattern depicted in the image to process (step S12).

In step S12, first, the processor 106 decides multiple parameters of a function model that treats two-dimensional image coordinates as variables, the parameters being parameters for optimizing an evaluation value based on the difference between respective pixel values represented by the function model and respective pixel values in the image to process (step S12a). Subsequently, the processor 106 computes the position of a crossing point of two straight lines expressed by the decided multiple parameters, and thereby detects with subpixel precision the crossing point of two boundary lines in the image to process (step S12b).

With this arrangement, there are decided multiple parameters of a function model that treats two-dimensional image coordinates as variables, the parameters being parameters for optimizing an evaluation value based on the difference between respective pixel values represented by the function model and respective pixel values in an image to process, and crossing points are computed on the basis of the multiple parameters. Consequently, by optimizing the evaluation value, the function model that treats two-dimensional image coordinates as variables can be matched to a pattern being depicted in the image to process. As a result, even if the checker pattern is rotated, or in other words, even if the boundary lines (that is, the edges) of the checker pattern being depicted in the image to process are tilted, a function model that expresses the tilted boundary lines appropriately can be generated. Since the boundary lines are expressed appropriately by the multiple parameters of the function model generated in this way, a crossing point of two boundary lines can be detected with high precision.

In addition, as illustrated in FIG. 4, since the function model uses a curved surface that is at least first-order differentiable to express pixel values at respective positions in a two-dimensional coordinate system at the boundaries between a first region which is a black region and a second region which is a white region, for example, aliasing can be expressed appropriately. Consequently, crossing points can be detected with high precision, even from a checker pattern that includes edges along directions other than the horizontal direction and the vertical direction.

Furthermore, since pixel values are expressed by a curved surface that is at least first-order differentiable, a gradient method can be used to optimize the evaluation value simply, potentially reducing the computational cost.

Furthermore, since the crossing points of a checker pattern can be detected with high precision, it is possible to increase the precision of calibration that associates the positions of the crossing points of a checker pattern in a three-dimensional coordinate system with the positions of the crossing points in a captured image.

Embodiment 2

Herein, the root mean square error of 0.10 pixels produced by the function model according to Embodiment 1 above is produced due to differences between the function model and the spatial distribution of the actual pixel values. The cause of this error is described below.

When a step edge, which is a boundary between a black region and a white region in a square image, is imaged by the camera 102, the pixel values are determined by a pixel integration effect.

Figure 12:
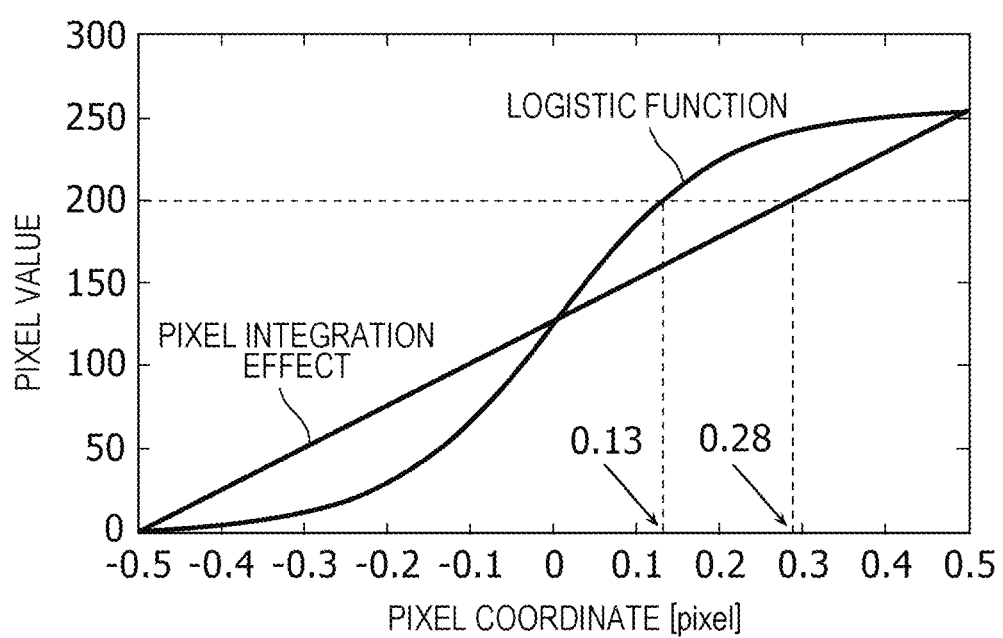
FIG. 12 is a diagram for explaining a cause of error in a function model.

FIG. 11 is a diagram illustrating an example of the pixel integration effect, while FIG. 12 is a diagram for explaining the cause of error in the function model.

For example, as illustrated in FIG. 11, a pixel of an image sensor is divided into two regions of equal area. In one region, light corresponding to the pixel a+d per unit area is incident, while in the other region, light corresponding to the pixel value d per unit area is incident. In this case, the pixel value output from the pixel becomes a/2+d. On the other hand, as illustrated in FIG. 12, the pixel values of subpixel positions of a logistic function (that is, subpixel values) are different from the pixel value determined by the pixel integration effect. In FIG. 12, the coordinate of a pixel having a pixel value of 200 is 0.13 pixels by the logistic function, but 0.28 pixels by the pixel integration effect. Consequently, in the crossing point detector 101 using the function model in Embodiment 1, crossing points can be detected with high precision, but there is still potential for even higher precision.

[Numerical Model]

A crossing point detector according to Embodiment 2 uses a numerical model instead of a function model to thereby detect crossing points with higher precision than the crossing point detector of Embodiment 1.

Figure 13:
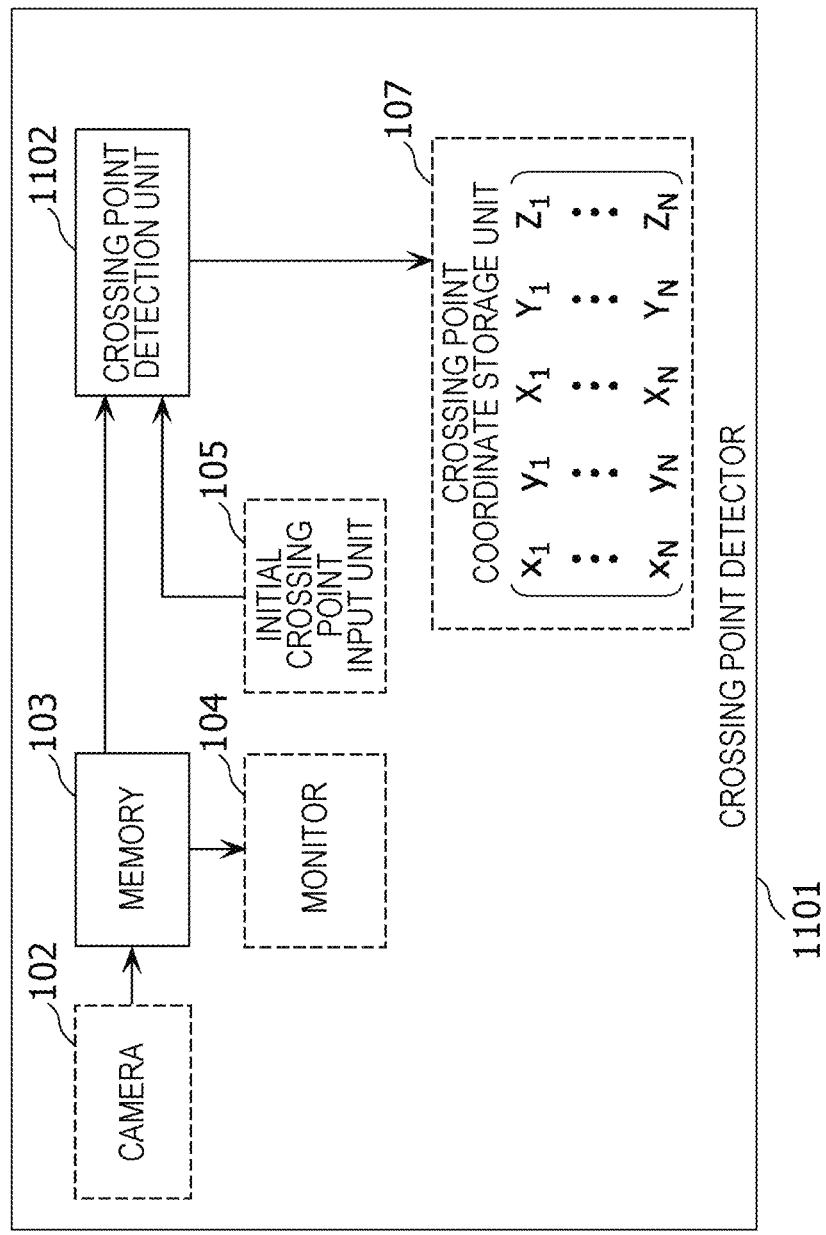
FIG. 13 is a block diagram of a crossing point detector according to Embodiment 2.

FIG. 13 is a block diagram of a crossing point detector according to Embodiment 2. As illustrated in FIG. 13, a crossing point detector 1101 according to the present embodiment is provided with a camera 102, memory 103, a monitor 104, an initial crossing point input unit 105, a crossing point detection unit 1102, and a crossing point coordinate storage unit 107. Note that in the present embodiment, the crossing point detector 1101 is provided with the camera 102, the monitor 104, the initial crossing point input unit 105, and the crossing point coordinate storage unit 107, but these component elements may also not be provided. In addition, the crossing point detection unit 1102 according to the present embodiment is made up of at least one processor, for example. Also, in the present embodiment, component elements that are the same as Embodiment 1 are denoted with the same reference signs as Embodiment 1, and detailed description thereof will be reduced or omitted.

Hereinafter, the operation of the crossing point detection unit 1102 that detects crossing points with a numerical model will be described.

The crossing point detection unit 1102 reads out at least a partial image of the captured image from the memory 103 as an image to process, and detects a crossing point of two boundary lines in the checker pattern depicted in the image to process. Note that each of the two boundary lines is a boundary line between a first region made up of multiple pixels having a first pixel value and a second region made up of multiple pixels having a second pixel value greater than the first pixel value in the image to process.

Specifically, the crossing point detection unit 1102 decides multiple parameters of a numerical model, the parameters being parameters for optimizing an evaluation value based on the difference between respective pixel values represented by the numerical model and respective pixel values in the image to process. Subsequently, the crossing point detection unit 1102 computes the position of a crossing point of two straight lines expressed by the decided multiple parameters, and thereby detects with subpixel precision the crossing point of two boundary lines in the image to process. Herein, a numerical model is a model that simulates a pixel integration effect when imaging a step edge by assigning pixel values to respective regions inside a pixel divided by a straight line, and deciding the pixel value of the overall pixel. Specifically, when deciding the multiple parameters of the numerical model, first, the crossing point detection unit 1102 generates multiple subpixels by oversampling the pixel, and divides the pixel into multiple regions with a straight line expressed by the multiple parameters. Next, the crossing point detection unit 1102 assigns a subpixel value expressed by the multiple parameters to each subpixel included in each of the multiple regions. Subsequently, the crossing point detection unit 1102 computes a pixel value expressed by the numerical model by numerically integrating the subpixel values over the range of the pixel.

In other words, the crossing point detection unit 1102 fits a numerical model to a checker pattern depicted in a square image, namely, the image to process read out from the memory 103. By fitting the numerical model, the position of a crossing point can be detected with subpixel precision, even from a checker pattern that includes edges in directions other than the horizontal direction and the vertical direction. Note that fitting the numerical model refers to deciding multiple parameters of the numerical model for optimizing the evaluation value described above. The crossing point detection unit 1102 decides the multiple parameters of the numerical model for optimizing the evaluation value while changing the multiple parameters of the numerical model, or in other words, while changing the position of the crossing point of the two straight lines described above from the position (that is, the coordinates) of an initial crossing point.

Additionally, in the numerical model, since the pixel integration effect when imaging a step edge in the captured image is modeled, the detection precision can be improved. In other words, in the numerical model, subpixel values are assigned to multiple subpixels obtained by oversampling a pixel, and these subpixel values are numerically integrated or averaged over the range of the original one pixel. With this arrangement, the occurrence of aliasing can be modeled with high precision. Such a pixel integration effect is required in the case of detecting with higher precision crossing points in a checker pattern with subpixel precision.

Note that when reading out a square image from the memory 103, similarly to Embodiment 1, the crossing point detection unit 1102 first acquires the coordinates of an initial crossing point output from the initial crossing point input unit 105 (in other words, a second initial position). In other words, the crossing point detection unit 1102 acquires a position in the captured image being displayed in accordance with an operation by the operator as the second initial position. Subsequently, the crossing point detection unit 1102 reads out from the memory 103 a region including the second initial position from the captured image as the square image (that is, the image to process). Specifically, the crossing point detection unit 1102 reads out from the memory 103 a square image that is centered on the position of the initial crossing point.

Figure 14:
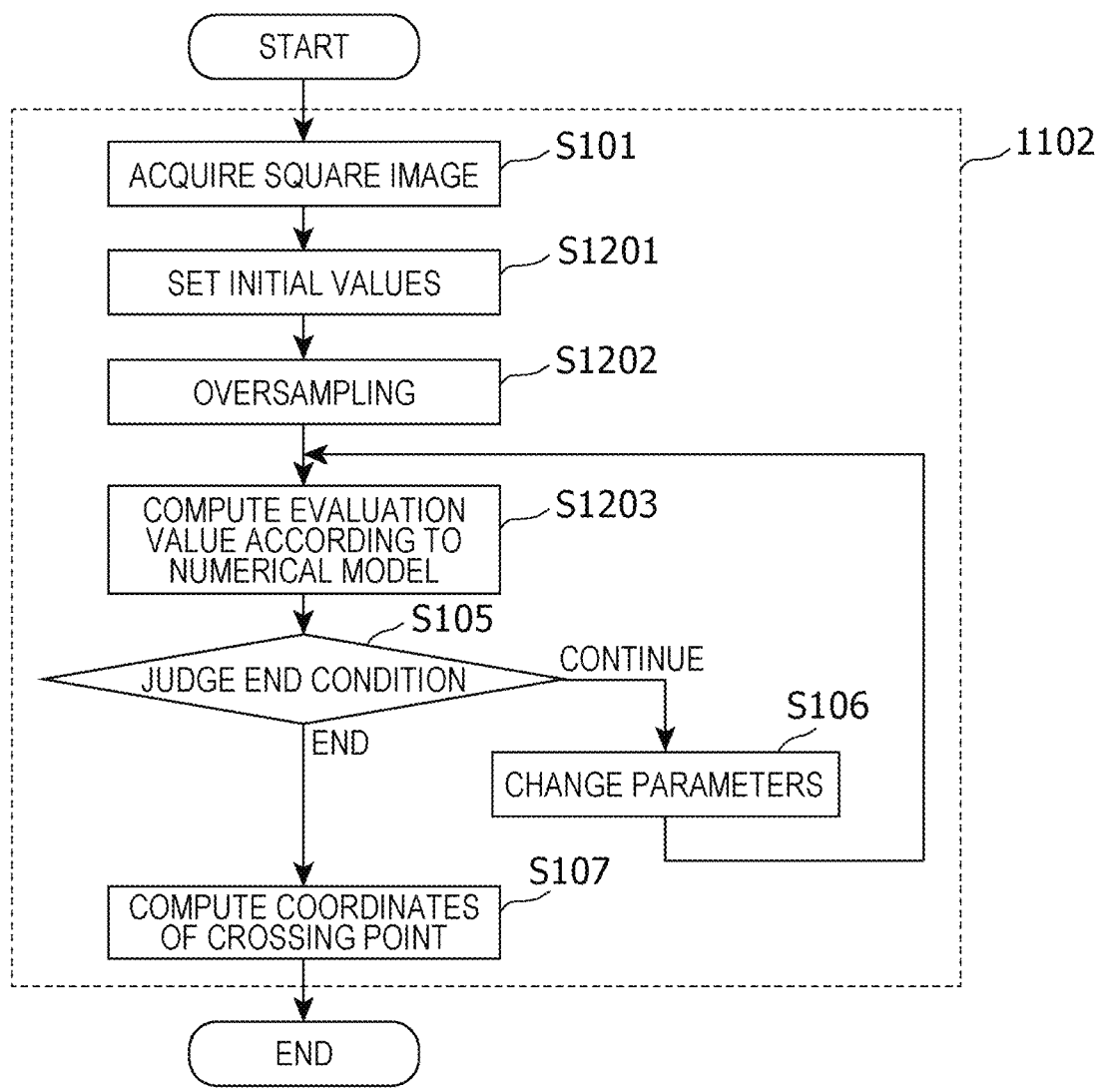
FIG. 14 is a flowchart illustrating operation of a crossing point detection unit according to Embodiment 2.

FIG. 14 is a flowchart illustrating operation of the crossing point detection unit 1102 according to the present embodiment. Note that in the flowchart illustrated in FIG. 14, steps that are the same as the flowchart illustrated in the flowchart in FIG. 3 of Embodiment 1 are denoted with the same reference signs as the flowchart illustrated in FIG. 3, and detailed description thereof will be reduced or omitted.

The crossing point detection unit 1102 acquires a square image centered on the position of the initial crossing point given by the operator (step S101). Next, on the basis of the position of the initial crossing point, the crossing point detection unit 106 sets initial values of multiple parameters (a, b, c, d, θ, φ) of the numerical model required for crossing point detection (step S1201).

Furthermore, the crossing point detection unit 1102 oversamples each pixel in the square image by a factor of Nx in the x-axis direction and by a factor of Ny in the y-axis direction (step S1202). With this arrangement, a single pixel is divided into Nx×Ny subpixels. In the case of oversampling by a factor of 2 or more, aliasing can be reproduced by the numerical model.

Next, the crossing point detection unit 1102 computes an evaluation value according to the numerical model (step S1203). Subsequently, the crossing point detection unit 1102, similarly to the crossing point detection unit 106 of Embodiment 1, detects the position of a crossing point by executing the processes in steps S105 to S107.

Figure 15:
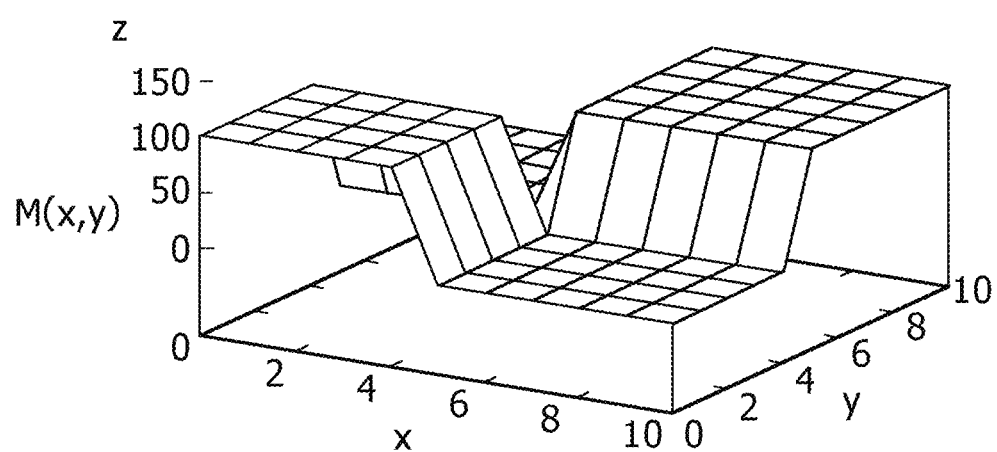
FIG. 15 is a diagram illustrating an outline of a numerical model according to Embodiment 2.

FIG. 15 is a diagram illustrating an outline of a numerical model.

The crossing point detection unit 1102 decides multiple parameters of the numerical model, the multiple parameters being parameters for optimizing (substantially minimizing) the evaluation value to fit the numerical model illustrated in FIG. 15 to the checker pattern in the square image. With this numerical model, in a region where a z value corresponding to pixel value changes, the z value changes linearly with respect to changes in position along the x-axis direction or the y-axis direction. In other words, this numerical model numerically expresses a pixel integration effect.

Figure 16:
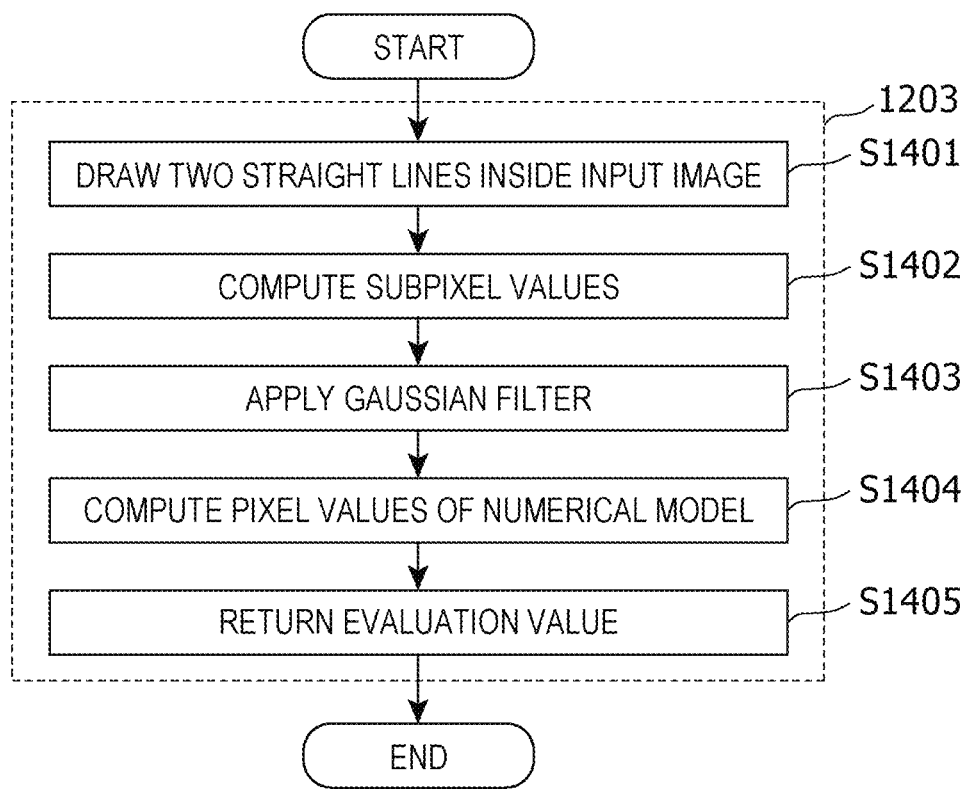
FIG. 16 is a flowchart illustrating details of the computation of an evaluation value in step S1203 of FIG. 14.

FIG. 16 is a flowchart illustrating details of the computation of an evaluation value in step S1203 of FIG. 14. As illustrated in FIG. 16, the crossing point detection unit 1102 creates a numerical model, and evaluates the fit with the square image.

First, the crossing point detection unit 1102 draws the two lines (x cos θ+y sin θ+b=0) and (x sin φ−y cos φ+c=0) inside the square image (step S1401). Next, the crossing point detection unit 1102 computes subpixel values Sk(xi, yi) for the subpixels produced by oversampling the pixel (xk, yk) in the square image (step S1402).

Figure 17:
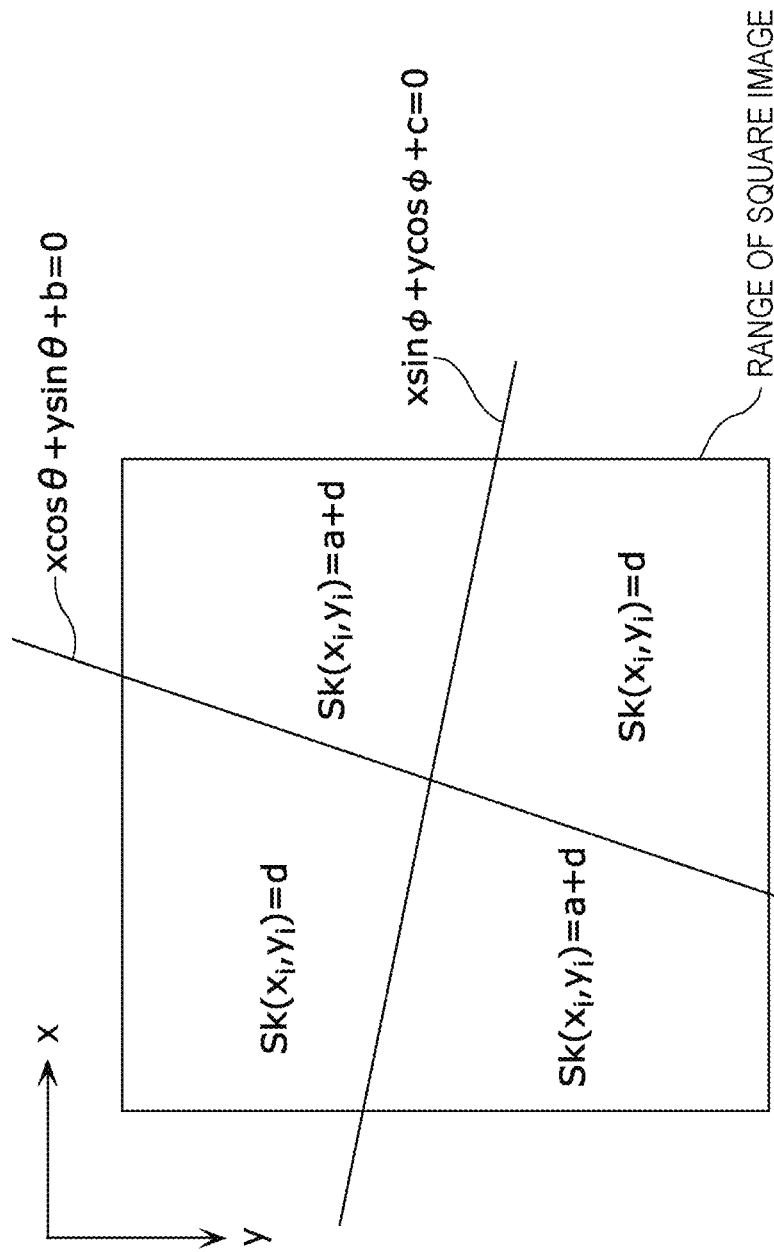
FIG. 17 is a diagram illustrating subpixel values of respective regions in a square image.

FIG. 17 is a diagram illustrating subpixel values of respective regions in a square image.

In step S1402, the crossing point detection unit 1102 assigns the subpixel value d or (a+d) as indicated in (Formula 6) below to each region inside the square image divided by two straight lines.

$$S_k(x_i, y_i) = \begin{cases} d, & (x\cos\theta + y\sin\theta + b)(x\sin\phi - y\cos\phi + c) \geq 0 \\ a+d, & (x\cos\theta + y\sin\theta + b)(x\sin\phi - y\cos\phi + c) < 0 \end{cases} \quad (6)$$

Herein, in (Formula 6) above, i indicates an index of the Nx×Ny subpixels, (a+d) indicates the white level, and d indicates the black level.

Next, the crossing point detection unit 1102 applies a Gaussian filter using the parameter σ indicating the degree of blur to all subpixels in the square image (step S1403). In other words, the crossing point detection unit 1102 substitutes the pixel values I(x, y) in (Formula 1) with the subpixel values Sk(xi, yi), and thereby obtains the subpixel values S'k(xi, yi) after applying the Gaussian filter to the subpixel values Sk(xi, yi). Note that although a Gaussian filter is applied to the subpixel values in the present embodiment, such application is not required, and a Gaussian filter may also not be applied.

Next, as indicated in (Formula 7) below, the crossing point detection unit 1102 computes the pixel values M(xk, yk) of the numerical model as the average values of the subpixel values S'k(xi, yi) after applying the Gaussian filter (step S1404).

$$M(x_k, y_k) = \frac{1}{N_x \cdot N_y} \sum_{i=1}^{N_x \cdot N_y} S'_k(x_i, y_i) \quad (7)$$

Figure 18:
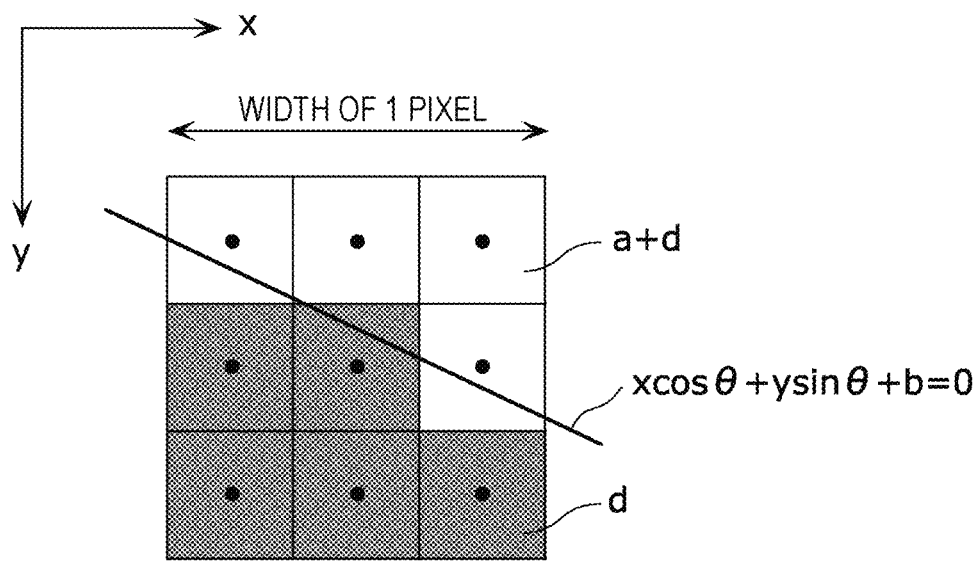
FIG. 18 is a diagram illustrating an example of a pixel value M(xk, yk) in a numerical model.
Figure 19:
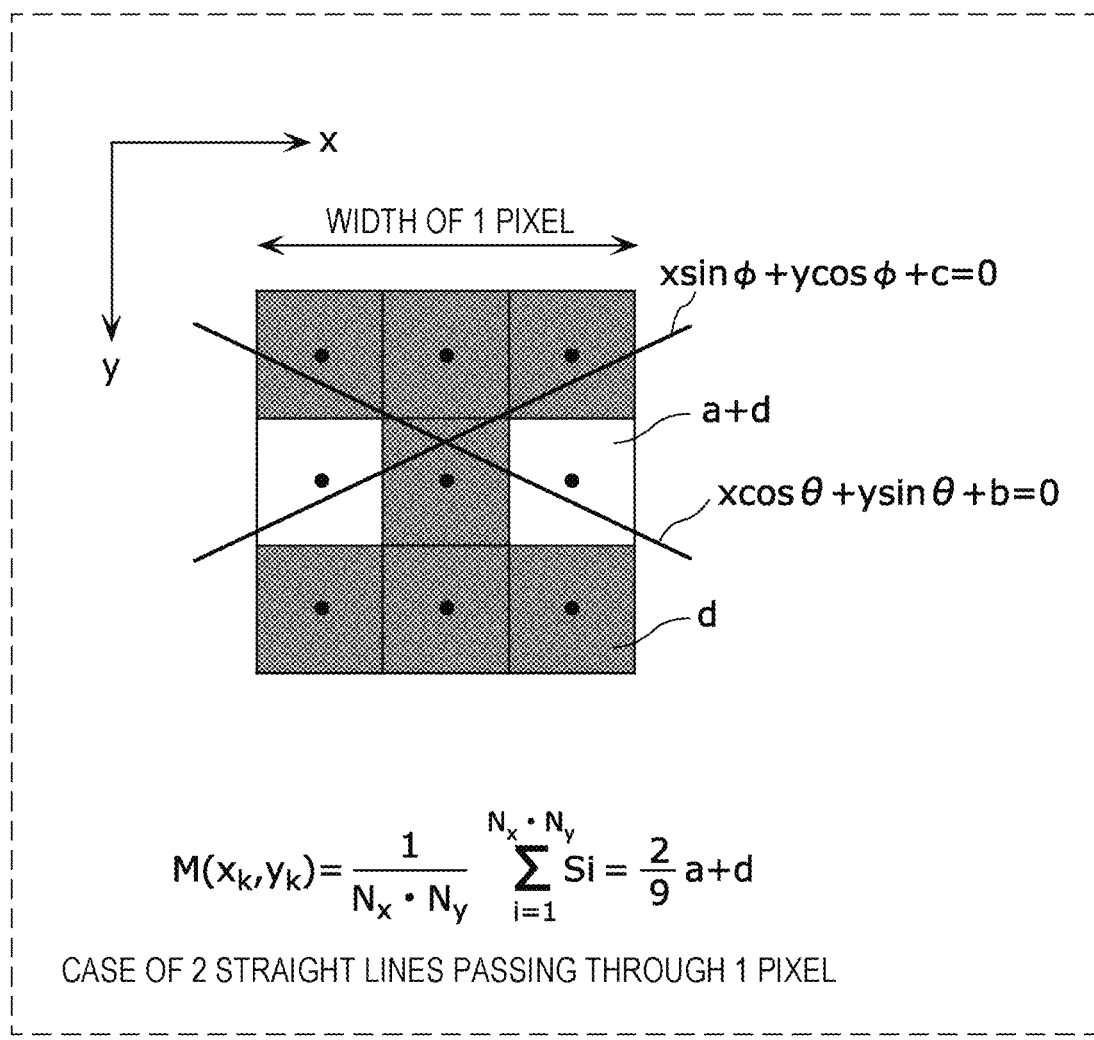
FIG. 19 is a diagram illustrating another example of a pixel value M(xk, yk) in a numerical model.

FIG. 18 is a diagram illustrating an example of a pixel value M(xk, yk) in a numerical model. FIG. 19 is a diagram illustrating another example of a pixel value M(xk, yk) in a numerical model. Specifically, FIGS. 18 and 19 illustrate examples for the case of computing the pixel value M(xk, yk) from 9 subpixels obtained by oversampling by a factor of 3 for each of Nx and Ny.

As illustrated in FIG. 18, in the case in which one straight line (x cos θ+y sin θ+b=0) cuts across the pixel, the crossing point detection unit 1102 follows (Formula 6) above to assign the subpixel value (a+d) or a to the 9 subpixels included in the pixel. Subsequently, the crossing point detection unit 1102 follows (Formula 7) above to compute the average value of these subpixel values as the pixel value M(xk, yk) of the numerical model.

As illustrated in FIG. 19, in the case in which two straight lines (x cos θ+y sin θ+b=0) and (x cos φ+y sin φ+c=0) cut across the pixel, the crossing point detection unit 1102 computes subpixel values. Namely, the crossing point detection unit 1102 follows (Formula 6) above to assign the subpixel value (a+d) or a to the 9 subpixels included in the pixel. Subsequently, the crossing point detection unit 1102 follows (Formula 7) above to compute the average value of these subpixel values as the pixel value M(xk, yk) of the numerical model.

In this way, the crossing point detection unit 1102 according to the present embodiment numerically integrates or averages each of the subpixel values of multiple subpixels obtained by oversampling, over the range of the one pixel before the oversampling is conducted, as indicated in (Formula 7) above. With this arrangement, the aliasing produced in each pixel when imaging a step edge can be reproduced precisely, and as a result, raising the precision of detecting the position of a crossing point becomes possible.

The crossing point detection unit 1102 computes the fitness of the numerical model to the checker pattern in the square image as an evaluation value J, and returns the evaluation value J to the process illustrated in FIG. 14 (step S1405). In other words, the crossing point detection unit 1102 computes the residual sum of squares between the pixel value M(xk, yk) of the numerical model and the pixel value I(xk, yk) of the square image as the evaluation value J, as indicated in (Formula 8) below.

$$J = \sum_{k=1}^{N} (M(x_k, y_k) - I(x_k, y_k))^2 \quad (8)$$

Since differentiation is unavailable in the numerical model, in the iterative calculation made up steps S1203, S105, and S106 illustrated in FIG. 14, a gradient method such as the steepest descent method cannot be used, unlike the iterative calculation in the function model. For this reason, the crossing point detection unit 1102 varies each of the multiple parameters of the numerical model over a specific range from the respective initial values, and determines the multiple parameters by which the evaluation value J is substantially minimized. With this arrangement, the multiple parameters of the numerical model for optimizing the evaluation value J are decided.

FIG. 20 is a diagram illustrating the detection precision of crossing points by the crossing point detector 1101 using a numerical model according to the present embodiment. The detection precision is the detection precision of the numerical model with respect to a CG captured image, similar to the detection precision of the function model according to Embodiment 1. The root mean square error is 0.04 pixels, which is less than that of the function model according to Embodiment 1. Consequently, in the present embodiment, the position of crossing points can be detected with higher precision.

Figure 21:
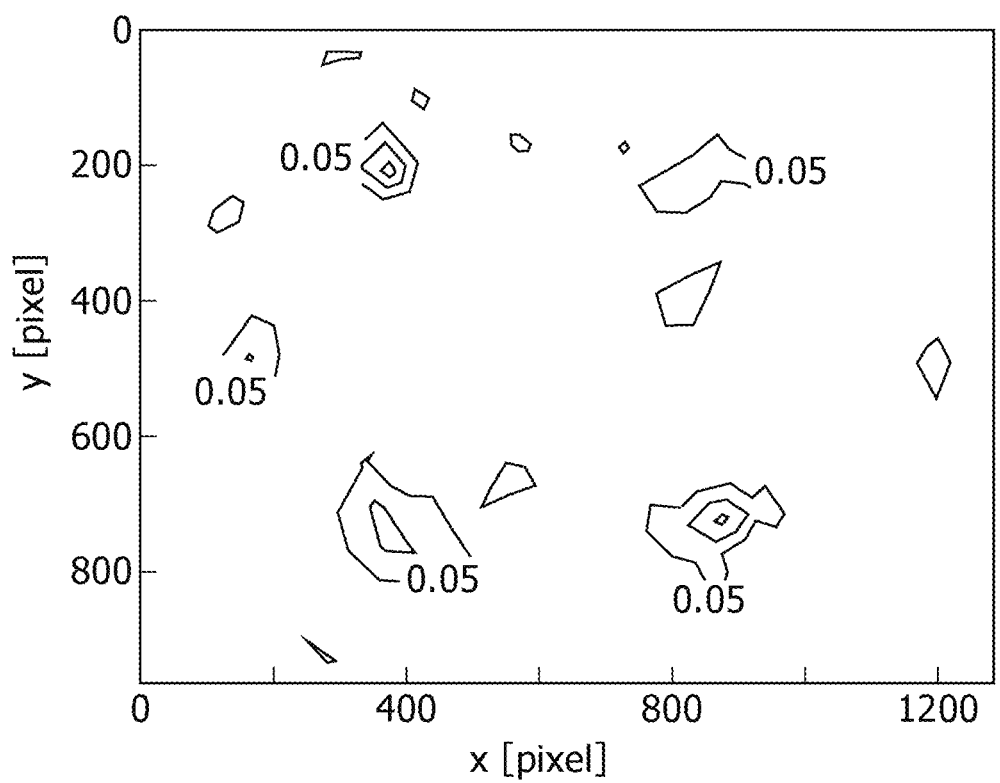
FIG. 21 is an error distribution diagram illustrating the error between the positions of crossing points detected by a crossing point detector using a numerical model according to Embodiment 2, and the actual positions of crossing points.

FIG. 21 is a contour map in which height is used to illustrate the error between the positions of crossing points detected by the crossing point detector 1101 using a numerical model according to the present embodiment, and the actual positions of crossing points. As illustrated in FIG. 21, in the present embodiment, the positions of crossing points can be detected with higher precision, even in regions with large distortion of the checker pattern in the CG captured image.

Summary of Embodiment 2

The above thus describes the crossing point detector 1101 and the crossing point detection method according to Embodiment 2. To summarize, the crossing point detector 1101 includes the configuration illustrated in FIG. 22A, and the crossing point detection method is indicated by the flowchart illustrated in FIG. 22B.

Figure 22A:
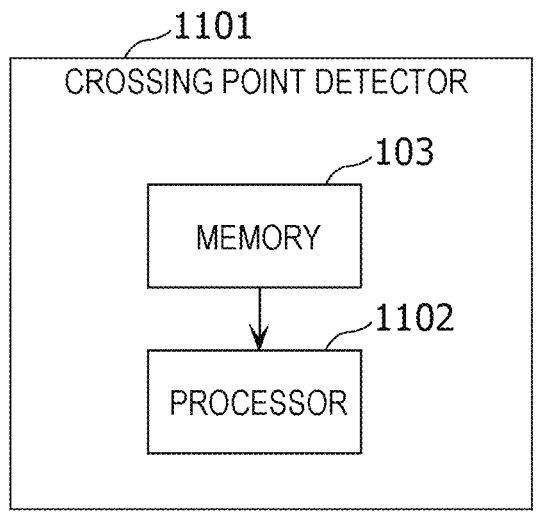
FIG. 22A is a block diagram illustrating a configuration of a crossing point detector according to a second aspect of the present disclosure.

FIG. 22A is a block diagram illustrating a configuration of the crossing point detector 1101 according to a second aspect of the present disclosure.

The crossing point detector 1101 is provided with memory 103 and a processor 1102. The memory 103 stores the captured image obtained by the imaging of a checker pattern. The processor 1102 reads out at least a partial image of the captured image from the memory 103 as the image to process. Subsequently, the processor 1102 detects a crossing point of two boundary lines in the checker pattern depicted in the image to process.

Herein, each of the two boundary lines is a boundary line between a first region made up of multiple pixels having a first pixel value and a second region made up of multiple pixels having a second pixel value greater than the first pixel value in the image to process.

Also, the processor 1102 decides multiple parameters of a numerical model, the parameters being parameters for optimizing an evaluation value based on the difference between respective pixel values represented by the numerical model and respective pixel values in the image to process. Subsequently, the processor 1102 computes the position of a crossing point of two straight lines expressed by the decided multiple parameters, and thereby detects with subpixel precision the crossing point of two boundary lines in the image to process.

Herein, a numerical model is a model that simulates a pixel integration effect when imaging a step edge by assigning pixel values to respective regions inside a pixel divided by a straight line, and deciding the pixel value of the overall pixel.

Figure 22B:
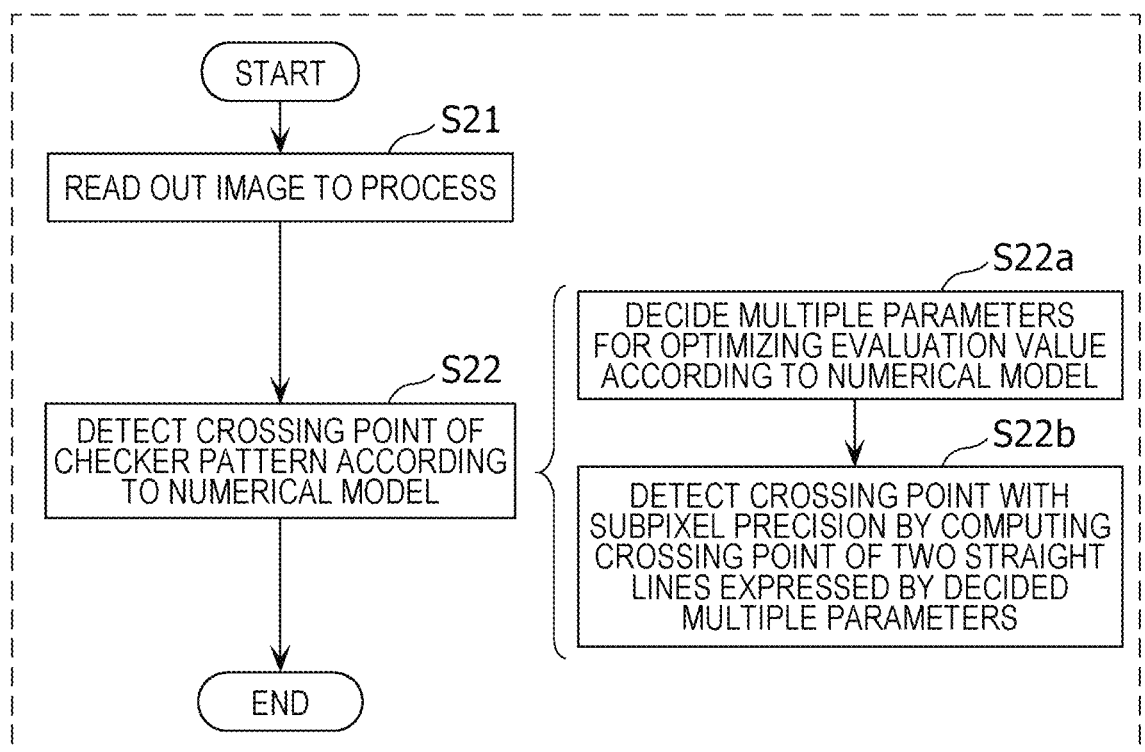
FIG. 22B is a flowchart of a crossing point detection method according to a second aspect of the present disclosure.

FIG. 22B is a flowchart illustrating the crossing point detection method according to the second aspect of the present disclosure.

First, the processor 1102 reads out, from the memory 103 storing the captured image obtained by imaging the checker pattern, at least a partial image of the captured image as the image to process (step S21). Subsequently, the processor 1102 detects a crossing point of two boundary lines in the checker pattern depicted in the image to process (step S22).

In step S22, first, the processor 1102 decides multiple parameters of a numerical model, the parameters being parameters for optimizing an evaluation value based on the difference between respective pixel values represented by the numerical model and respective pixel values in the image to process (step S22a). Subsequently, the processor 1102 computes the position of a crossing point of two straight lines expressed by the decided multiple parameters, and thereby detects with subpixel precision the crossing point of two boundary lines in the image to process (step S22b).

With this arrangement, there are decided multiple parameters of a numerical model, the parameters being parameters for optimizing an evaluation value based on the difference between respective pixel values represented by the numerical model and respective pixel values in an image to process, and crossing points are computed on the basis of the multiple parameters. Consequently, by optimizing the evaluation value, the numerical model can be matched to a pattern being depicted in the image to process. As a result, even if the checker pattern is rotated, or in other words, even if the boundary lines (that is, the edges) of the checker pattern being depicted in the image to process are tilted, a numerical model that expresses the tilted boundary lines appropriately can be generated. Since the boundary lines are expressed appropriately by the multiple parameters of the numerical model generated in this way, a crossing point of two boundary lines can be detected with high precision.

Also, a numerical model is a model that simulates a pixel integration effect when imaging a step edge by assigning pixel values to respective regions inside a pixel divided by a straight line, and deciding the pixel value of the overall pixel. For this reason, aliasing can be reproduced more appropriately. Consequently, crossing points can be detected with high precision, even from a checker pattern that includes edges along directions other than the horizontal direction and the vertical direction.

Furthermore, since the crossing points of a checker pattern can be detected with higher precision, it is possible to increase further the precision of calibration that associates the positions of the crossing points of a checker pattern in a three-dimensional coordinate system with the positions of the crossing points in a captured image.

Embodiment 3

[Coarse-to-Fine Search in Crossing Point Detection]

As described above, in the case of detecting crossing points with a function model, the calculation cost is low because a gradient method is usable. On the other hand, in the case of detecting crossing points with a numerical model, the calculation cost is high because a gradient method is unusable, but crossing points can be detected with higher precision.

Accordingly, the crossing point detector 1101 according to the present embodiment has a configuration similar to the crossing point detector 1101 according to Embodiment 2, but the crossing point detection unit 1102 according to the present embodiment is additionally provided with the functions of the crossing point detection unit 106 according to Embodiment 1. In other words, the crossing point detection unit 1102 according to the present embodiment computes the position of a crossing point with a function model as a first initial position, similarly to Embodiment 1. Next, the crossing point detection unit 1102 optimizes the evaluation value J while changing the position of the crossing point of the two straight lines expressed by the multiple parameters of the numerical model from the first initial position. With this arrangement, a coarse-to-fine search for a crossing point can be conducted, and a crossing point can be detected with high precision while reducing the calculation cost.

Figure 23:
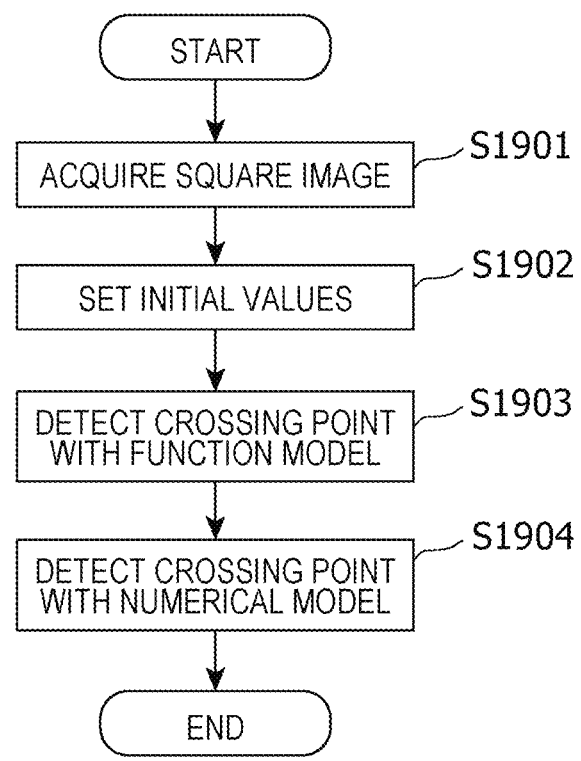
FIG. 23 is a flowchart illustrating operation of a crossing point detection unit according to Embodiment 3.

FIG. 23 is a flowchart illustrating operation of the crossing point detection unit 1102 according to the present embodiment. Note that the flowchart illustrated in FIG. 23 is a coarse-to-fine search procedure for efficiently calculating a crossing point in a checker pattern.

First, the crossing point detection unit 1102 acquires a square image centered on the position of the initial crossing point given by the operator (step S1901). Subsequently, the crossing point detection unit 1102 sets the initial values of the parameters required by the function model (step S1902).

Next, the crossing point detection unit 1102 uses the initial values to detect the position of a crossing point with the function model as a first initial position, similarly to Embodiment 1 (step S1903). Subsequently, the crossing point detection unit 1102 uses the first initial position detected by the function model as the position of the initial crossing point (the second initial position described above). In other words, the crossing point detection unit 1102 optimizes the evaluation value J indicated in (Formula 8) above while changing the position of the crossing point of the two straight lines expressed by the multiple parameters of the numerical model from the first initial position. With this arrangement, the final crossing point is detected by the numerical model (step S1904).

Herein, as described above, since a gradient method is usable for the crossing point detection by the function model, the calculation cost associated with crossing point detection by the function model is lower than the calculation cost associated with crossing point detection by the numerical model. Specifically, the calculation cost of detection by the function model is on the order of $\frac{1}{100}$ the calculation cost of detection by the numerical model. Meanwhile, since the pixel integration effect and aliasing can be reproduced with the crossing point detection by the numerical model, the detection precision for detecting the position of a crossing point by the numerical model is higher than the detection precision for detecting the position of a crossing point by the function model. For this reason, the coarse-to-fine search technique according to the present embodiment, in which crossing point detection by the function model is used as a coarse search, and crossing point detection by the numerical model is used as a fine search, is able to detect crossing points with low calculation cost and high precision.

Namely, with respect to Embodiment 2, the crossing point detection unit 1102 according to the present embodiment additionally decides multiple parameters of a function model that treats two-dimensional image coordinates as variables, the parameters being parameters for optimizing an evaluation value based on the difference between respective pixel values represented by the function model and respective pixel values in the image to process. Subsequently, the crossing point detection unit 1102 computes the position of the crossing point of two straight lines expressed by the decided multiple parameters as a first initial position. To decide the multiple parameters of the numerical model, the crossing point detection unit 1102 optimizes the evaluation value J (indicated in Formula 8) above while changing the position of the crossing point of the two straight lines expressed by the multiple parameters of the numerical model from the first initial position. By this optimization, the multiple parameters of the numerical model are decided. Consequently, by computing the position of the crossing point of the two straight lines expressed by the decided multiple parameters, the crossing point detection unit 1102 ultimately detects with subpixel precision the crossing point of two boundary lines in the image to process.

With this arrangement, a coarse-to-fine search of crossing points of a checker pattern can be conducted. In other words, by using a function model to detect the rough position of a crossing point as a first initial position, and additionally using a numerical model to search for a crossing point from the first initial position, a crossing point of a checker pattern can be detected. Crossing point detection using a function model has a low computational cost, but the crossing point detection precision is lower than crossing point detection using a numerical model. Conversely, crossing point detection using a numerical model has a high computational cost, but the crossing point detection precision is higher than crossing point detection using a function model. Consequently, by conducting the coarse-to-fine search described above, a favorable balance between reducing the computational cost and improving the detection precision can be achieved.

Embodiment 4

In Embodiments 1 to 3 above, an initial position is received by an operation performed by the operator, and a crossing point is detected semi-automatically by using at least one of the function model and the numerical model with respect to the vicinity of the initial crossing point. On the other hand, in the present embodiment, a crossing point is detected by generating the initial crossing point automatically, without receiving an operation performed by the operator.

Figure 24:
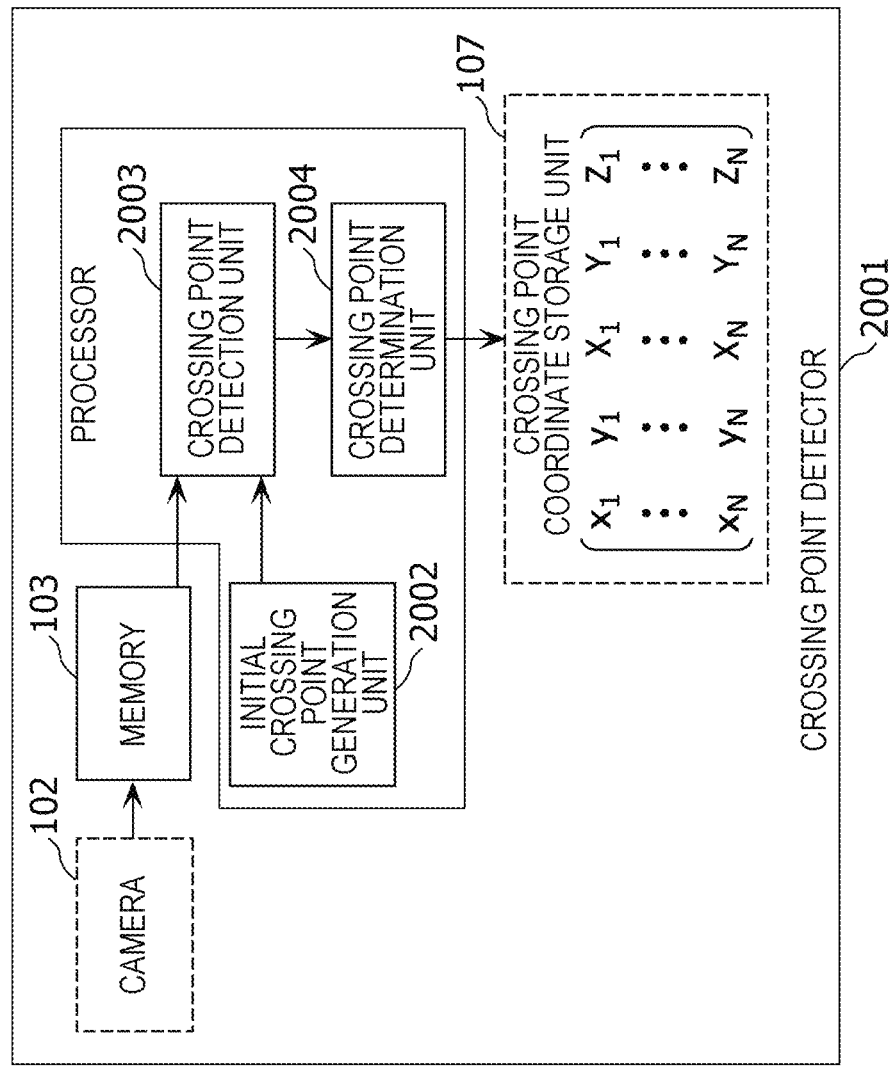
FIG. 24 is a block diagram of a crossing point detector according to Embodiment 4.

FIG. 24 is a block diagram of a crossing point detector according to the present embodiment. As illustrated in FIG. 24, a crossing point detector 2001 according to the present embodiment is provided with a camera 102, memory 103, an initial crossing point generation unit 2002, a crossing point detection unit 2003, a crossing point determination unit 2004, and a crossing point coordinate storage unit 107. Note that in the present embodiment, the crossing point detector 2001 is provided with the camera 102 and the crossing point coordinate storage unit 107, but these component elements may also not be provided. In addition, the component element group including the initial crossing point generation unit 2002, the crossing point detection unit 2003, and the crossing point determination unit 2004 according to the present embodiment is made up of at least one processor, for example. Also, in the embodiment, component elements that are the same as Embodiment 1 or Embodiment 2 are denoted with the same reference signs as Embodiment 1 or Embodiment 2, and detailed description thereof will be reduced or omitted.

Hereinafter, each of the initial crossing point generation unit 2002, the crossing point detection unit 2003, and the crossing point determination unit 2004 will be described.

The initial crossing point generation unit 2002 generates multiple initial crossing points arranged along each of the horizontal direction and the vertical direction. These initial crossing points are arranged in a lattice in the square image, and adjacent initial crossing points are separated from each other by a predetermined interval.

The crossing point detection unit 2003, similarly to the crossing point detection unit of Embodiments 1 to 3, reads out from the memory 103 an image to process (specifically, a square image), which is a partial image of the captured image and which is centered on an initial crossing point. Subsequently, the crossing point detection unit 2003 searches the square image for a crossing point of the checker pattern that optimizes the evaluation value J while changing the position of the crossing point used in the function model or the numerical model.

Herein, in the present embodiment, multiple initial crossing points are generated by the initial crossing point generation unit 2002. Accordingly, the crossing point detection unit 2003 sequentially selects one initial crossing point from the multiple initial crossing points generated by the initial crossing point generation unit 2002 as the selected initial crossing point. Subsequently, every time a selected initial crossing point is selected, the crossing point detection unit 2003 reads out from the memory 103 a square image centered on that selected initial crossing point. Furthermore, the crossing point detection unit 2003 searches the square image for a crossing point of the checker pattern while changing the position of the crossing point used in each of the models above from the position of the selected initial crossing point.

However, in some cases, a crossing point may not be depicted in the square image centered on the selected initial crossing point. In Embodiments 1 to 3, the operator selects the initial crossing point. Consequently, a crossing point of the checker pattern is depicted in the square image centered on that initial crossing point. However, in the present embodiment, since multiple initial crossing points are generated irrespectively of the contents of the square images, the square images centered on these initial crossing points do not necessarily depict a crossing point of the checker pattern.

Consequently, the crossing point detection unit 2003 may sometimes detect a position where there is no crossing point in the square image as the position of a crossing point. Accordingly, the crossing point detection unit 2003 outputs the detected position of a crossing point together with the optimized evaluation value J to the crossing point determination unit 2004.

The crossing point determination unit 2004 determines whether or not the evaluation value J is less than a threshold value to evaluate the reliability of the crossing point detected by the crossing point detection unit 2003. Namely, in the case in which the evaluation value J is less than the threshold value, the crossing point determination unit 2004 determines that a crossing point of the checker pattern depicted in the square image has been detected appropriately. For example, in the case in which the evaluation value J is a value near 0, the crossing point determination unit 2004 determines that a crossing point has been detected appropriately. Subsequently, the crossing point determination unit 2004 stores the position (xk, yk) of the detected crossing point in the crossing point coordinate storage unit 107. On the other hand, in the case in which the evaluation value J is equal to or greater than the threshold value, the crossing point determination unit 2004 determines that a position which is not a crossing point has been detected as the position of a crossing point, even though a crossing point is not being depicted in the square image. For example, in the case in which the square image is expressed using 256 tones, the crossing point determination unit 2004 determines that a position which is not a crossing point has been detected as the position of a crossing point if the evaluation value J is equal to or greater than 128. As a result, the crossing point determination unit 2004 discards the position of the detected crossing point without storing the position in the crossing point coordinate storage unit 107.

Note that in the present embodiment, in the case in which the end condition in step S105 illustrated in FIG. 3 and step S105 illustrated in FIG. 14 is determined by the number of repetitions of the iterative calculation, the reliability of a detected crossing point can be evaluated by the evaluation value J.

In this way, a processor in the present embodiment generates multiple predetermined initial crossing points, and sequentially selects one initial crossing point from these multiple initial crossing points as the selected initial crossing point. Subsequently, in the reading out of the image to process, every time a selected initial crossing point is selected, the processor reads out an image to process that includes the position of the selected initial crossing point. Also, in the detecting of a crossing point with subpixel precision, in the case in which the optimized evaluation value J is less than a threshold value, the processor detects with subpixel precision the crossing point of two boundary lines in the image to process on the basis of the multiple parameters.

With this arrangement, images to process are successively read out automatically, without requiring operations by the operator, and if a crossing point exists in the image to process, the crossing point can be detected with high precision.

Embodiment 5

A camera calibration system according to the present embodiment uses crossing points detected by the crossing point detector according to any of Embodiments 1 to 4 to compute the camera parameters of a camera used to image the checker pattern, and thereby calibrate the camera parameters.

FIG. 25 is a block diagram of a camera calibration system according to the present embodiment. As illustrated in FIG. 25, the camera calibration system 300 according to the present embodiment is provided with a crossing point detector 301, a 3D coordinate acquisition unit 302, a camera parameter computation unit 303, and a camera parameter output unit 304. Note that the component element group including the crossing point detector 301, the 3D coordinate acquisition unit 302, the camera parameter computation unit 303, and the camera parameter output unit 304 according to the present embodiment is made up of at least one processor, for example.

The crossing point detector 301 is the crossing point detector of any of Embodiments 1 to 4.

The 3D coordinate acquisition unit 302 acquires a position (Xn, Yn, Zn) in a three-dimensional coordinate system stored in the crossing point coordinate storage unit 107 according to Embodiments 1 to 4. This position in a three-dimensional coordinate system is a position in the world coordinate system of a crossing point of the checker pattern imaged by the camera 102. The checker pattern is the pattern drawn on the inside of a box-shaped object illustrated in FIG. 2. Such a 3D coordinate acquisition unit 302 defines the origin of the world coordinate system at a specific position in space, and also defines the three axes of an X-axis, a Y-axis, and a Z-axis, to thereby identify the position of the crossing point in the world coordinate system (that is, a three-dimensional coordinate system). The 3D coordinate acquisition unit 302 is a rangefinder, for example.

The camera parameter computation unit 303 computes the camera parameters of the camera 102 of the crossing point detector 301 on the basis of the position in the image coordinate system of a crossing point detected by the crossing point detector 301, and the position in the three-dimensional coordinate system acquired by the 3D coordinate acquisition unit 302.

One example of a method of computing camera parameters is Tsai's method (see Roger Y. Tsai, "A versatile camera calibration technique for high-accuracy 3D machine vision metrology using off-the-shelf TV cameras and lenses", IEEE Journal of Robotics and Automation, Vol. 3, pp. 323-344, 1987). In Tsai's method, camera parameters are computed by minimizing the sum of reprojection error. The reprojection error is the distance between a point obtained by projecting a point in the three-dimensional coordinate system onto an image according to the camera parameters (hereinafter also called a reprojection point), and a point in the image corresponding to that point in the three-dimensional coordinate system. Note that the point in the three-dimensional coordinate system is a point at a position acquired by the 3D coordinate acquisition unit 302. Also, the point in the image corresponding to the point in the three-dimensional coordinate system is a crossing point detected by the crossing point detector 301. With Tsai's method, the camera parameters are computed so as to minimize the sum of the reprojection error for multiple pairs, each made up of a reprojection point and a crossing point.

For example, in a model that uses a pinhole camera, the projection formula for projecting three-dimensional coordinates onto image coordinates using camera parameters is expressed by the mathematical expression below. By such a projection formula, the position of the reprojection point described above can be computed.

$$h \begin{bmatrix} x \\ y \\ 1 \end{bmatrix} = \begin{bmatrix} 1/d'x & 0 & C_x \\ 0 & 1/d'y & C_y \\ 0 & 0 & 1 \end{bmatrix} \begin{bmatrix} f & 0 & 0 & 0 \\ 0 & f & 0 & 0 \\ 0 & 0 & 1 & 0 \end{bmatrix} \begin{bmatrix} R_{11} & R_{12} & R_{13} & T_X \\ R_{21} & R_{22} & R_{23} & T_Y \\ R_{31} & R_{32} & R_{33} & T_Z \\ 0 & 0 & 0 & 1 \end{bmatrix} \begin{bmatrix} X \\ Y \\ Z \\ 1 \end{bmatrix}$$

The camera parameters of the pinhole camera model include, as elements, the x-coordinate component Cx and the y-coordinate component Cy of the center of the camera image, the focal length f, the length d'x in the x-axis direction and the length d'y in the y-axis direction of one pixel of the image sensor of the camera, the component $R_{ij}$ of a 3×3 rotation matrix R that indicates rotation of the camera with respect to the bases of the three-dimensional coordinates, the X-coordinate component $T_X$, the Y-coordinate component $T_Y$, and the Z-coordinate component $T_Z$ of a translation vector that indicates the translational distance of the camera with respect to the bases of the three-dimensional coordinates, and a parameter h with no degrees of freedom. In the element $R_{ij}$ of the rotation matrix R, the subscript i indicates the row number of the rotation matrix R, while the subscript j indicates the column number of the rotation matrix R. For example, the intrinsic camera parameters, namely Cx, Cy, f, d'x, and d'y, have design values and may be prescribed according to the design values. The extrinsic camera parameters, namely the rotation matrix R and the translation vector T, are parameters related to the attitude and the position of the camera, and even if design values are available, these parameters cannot be prescribed according to the design values in some cases. For this reason, design values may be used for the intrinsic camera parameters, whereas the extrinsic camera parameters may be computed.

The camera parameter output unit 304 outputs camera parameters computed by the camera parameter computation unit 303. For example, the camera parameter output unit 304 may output a signal indicating the camera parameters to a device external to the camera calibration system 300, or display the camera parameters.

Note that the respective component elements of the camera calibration system 300 may be connected by a communication line or a network. For example, data transfer between the crossing point detector 301 and the camera parameter computation unit 303, and data transfer between the 3D coordinate acquisition unit 302 and the camera parameter computation unit 303, may be conducted via a communication line or a network.

In such a camera calibration system 300 according to the present embodiment, by using high-precision crossing point coordinates obtained by the crossing point detector 301, the camera parameters can be calibrated with high precision.

Other Embodiments

The foregoing thus describes a crossing point detector and a crossing point detection method according to several modes of the present disclosure on the basis of the foregoing embodiments, but the present disclosure is not limited to these embodiments. Embodiments obtained by applying various modifications that may occur to persons skilled in the art to the foregoing respective embodiments, as well as embodiments constructed by combining structural elements from different embodiments, may also be included in the scope of the present disclosure insofar as such embodiments do not depart from the gist of the present disclosure.

For example, in Embodiment 1, a logistic function expanded in two dimensions is used as the function model, but a function other than this logistic function may also be used. Specifically, an arc tangent function may also be used.

Figure 26A:
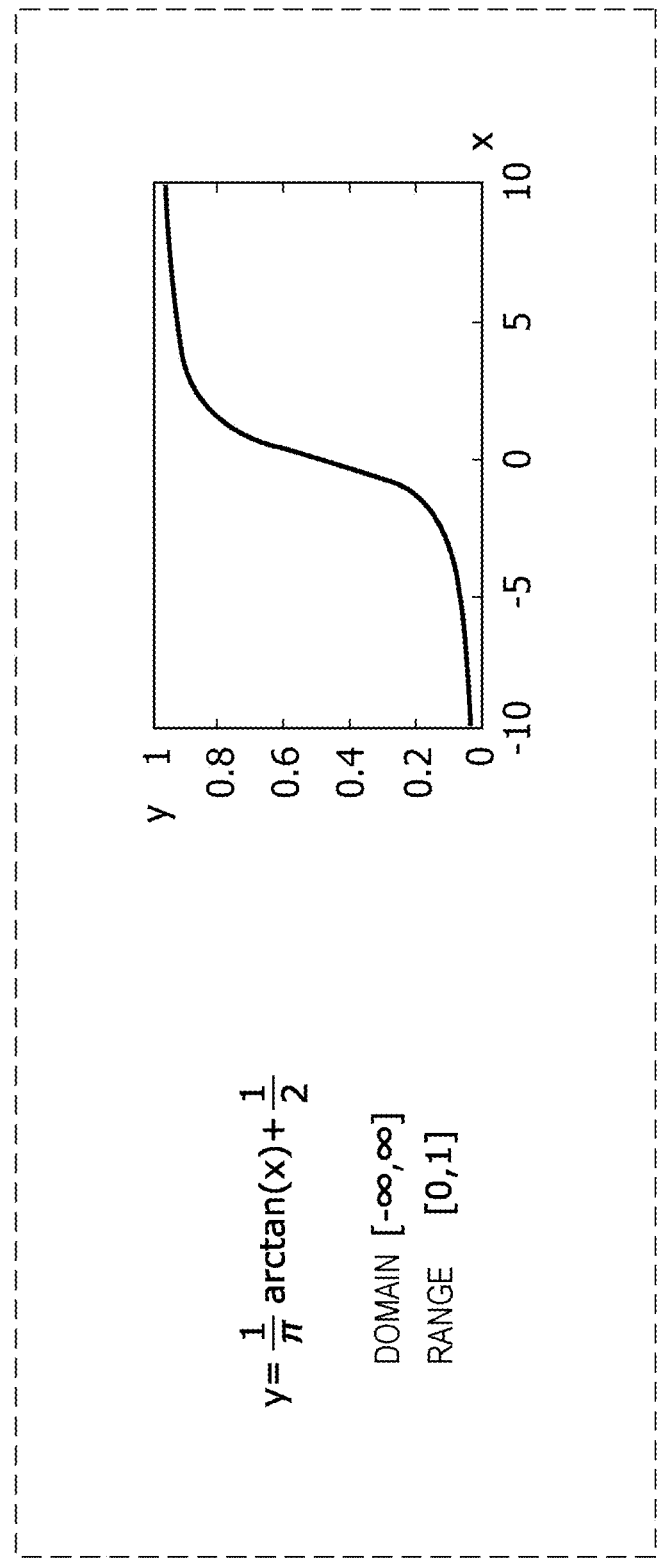
FIG. 26A is a diagram illustrating an example of a function model.

FIG. 26A is a diagram illustrating an arc tangent function used in the function model.

The crossing point detection unit 106 according to Embodiment 1 may also decide the multiple parameters of the function model for optimizing the evaluation value J based on the difference between respective pixel values expressed by a function model in which the arc tangent function illustrated in FIG. 26A is expanded in two dimensions, and respective pixel values in the square image.

Figure 26B:
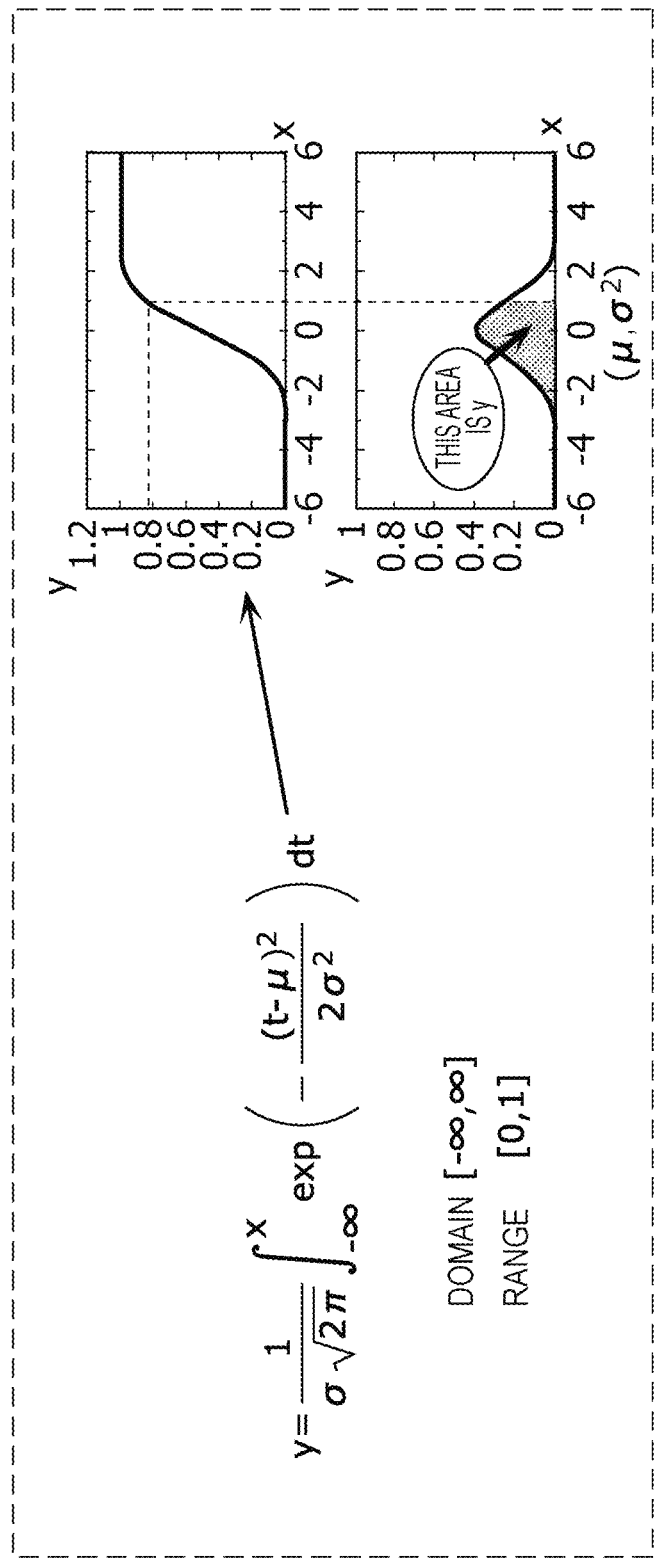
FIG. 26B is a diagram illustrating another example of a function model.

FIG. 26B is a diagram illustrating a cumulative distribution function of a normal distribution $N(\mu, \sigma^2)$ used in the function model. Note that $\mu$ is the mean, while $\sigma^2$ is the variance.

The crossing point detection unit 106 according to Embodiment 1 may also decide the multiple parameters of the function model for optimizing the evaluation value J based on the difference between respective pixel values expressed by a function model in which the cumulative distribution function of the normal distribution $N(\mu, \sigma^2)$ illustrated in FIG. 26B is expanded in two dimensions, and respective pixel values in the square image.

Figure 26C:
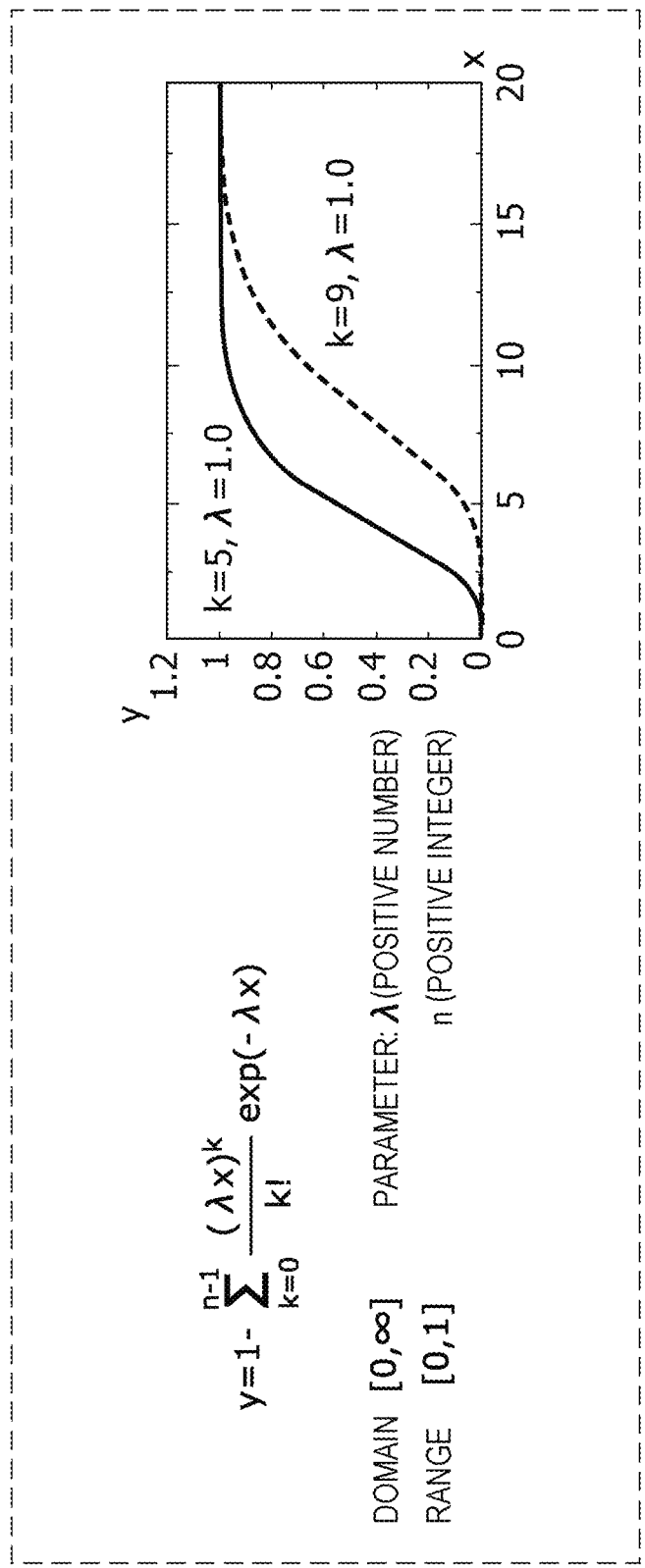
FIG. 26C is a diagram illustrating yet another example of a function model.

FIG. 26C is a diagram illustrating a cumulative distribution function of a kth-order Erlang distribution used in the function model.

The crossing point detection unit 106 according to Embodiment 1 may also decide the multiple parameters of the function model for optimizing the evaluation value J based on the difference between respective pixel values expressed by a function model in which the cumulative distribution function of the kth-order Erlang distribution illustrated in FIG. 26C is expanded in two dimensions, and respective pixel values in the square image.

Also, the crossing point detection unit 106 according to Embodiment 1 may also decide the multiple parameters of the function model for optimizing the evaluation value J based on the difference between respective pixel values expressed by a function model in which the polynomial function indicated in (Formula 9) below is expanded in two dimensions, and respective pixel values in the square image. Note that in (Formula 9), the domain is $[-\infty, \infty]$, while the range is $[0, 1]$.

$$y = \sum_{k=0}^{n-1} a_k x^k \qquad (9)$$

Also, in the present disclosure, all or part of the units and devices, or all or part of the function blocks in the block diagrams illustrated in FIGS. 1, 10A, 13, 22A, 24, and 25, may also be executed by one or multiple electronic circuits, including a semiconductor device, a semiconductor integrated circuit (IC), or a large-scale integration (LSI) chip. An LSI chip or IC may be integrated into a single chip, or be configured by combining multiple chips. For example, function blocks other than storage elements may be integrated into a single chip. Although referred to as an LSI chip or IC herein, such electronic circuits may also be called a system LSI chip, a very-large-scale integration (VLSI) chip, or an ultra-large-scale integration (ULSI) chip, depending on the degree of integration. A field-programmable gate array (FPGA) programmed after fabrication of the LSI chip, or a reconfigurable logic device in which interconnection relationships inside the LSI chip may be reconfigured or in which circuit demarcations inside the LSI chip may be set up, may also be used for the same purpose.

Furthermore, the function or operation of all or part of a unit, device, or part of a device may also be executed by software processing. In this case, the software is recorded onto a non-transitory recording medium, such as one or multiple ROM modules, optical discs, or hard disk drives, and when the software is executed by a processor, the software causes the processor and peripheral devices to execute specific functions in software. A system or device may also be equipped with one or multiple non-transitory recording media on which the software is recorded, a processor, and necessary hardware devices, such as an interface, for example.

In other words, in each of the foregoing embodiments, each structural element may be configured by dedicated hardware, or realized by executing a software program suited to each structural element. Each structural element may be realized as a result of a program execution unit such as a CPU or processor reading out and executing a software program recorded on a recording medium such as a hard disk or semiconductor memory. Herein, software realizing a crossing point detector and the like according to the foregoing respective embodiments is a program causing a computer to execute each step included in the flowchart illustrated in FIG. 3, 10B, 14, 16, 22B, or 23, for example.

The present disclosure exhibits an advantageous effect of enabling improved detection precision of crossing points in a checker pattern, and is useful as a crossing point detector for raising the precision of calibration in a vehicle-mounted camera or camera provided with a wide-angle lens, such as a fisheye lens, for example.

What is claimed is:

1. A coordinate position determiner, comprising:
a memory that stores an image obtained by imaging a checker pattern, the checker pattern including a first crossing point of a first line and a second line; and
a processor that reads out the image from memory and determines a coordinate position of a second crossing point, in a two-dimensional coordinate system, indicating a crossing point in the image that corresponds to the first crossing point, wherein
provided that a position of each pixel in the image is expressed by coordinate position $(x_k, y_k)$ in the two-dimensional coordinate system, a pixel value at the coordinate position $(x_k, y_k)$ in the image is $I(x_k, y_k)$, where k is a natural number less than or equal to n, and n is a total number of pixels included in the image, the second crossing point is a crossing point of a first boundary line and a second boundary line, the first boundary line being located on a boundary between a region that includes a first region included in the image and a second region included in the image, and a region that includes a third region included in the image and a fourth region included in the image, and the second boundary line being located on a boundary between a region that includes the first region and the third region, and a region that includes the second region and the fourth region, each pixel value of the pixels included in the first and fourth regions is greater than each pixel value of the pixels included in the second and third regions, the processor decides parameters of M(x, y) that optimize an evaluation value based on a difference between $M(x=x_k, y=y_k)$ and $I(x_k, y_k)$, M(x, y) indicates a pixel value at the coordinate position (x, y) in the two-dimensional coordinate system, the processor computes the position of the crossing point of the first boundary line and the second boundary line expressed by using the multiple parameters to thereby obtain the second crossing point with a precision by which a resolution in an x-axis direction of the two-dimensional coordinate system is less than $(x_k+1-x_k)$ and a resolution in a y-axis direction of the two-dimensional coordinate system is less than $(y_k+1-y_k)$, and M(x, y) expresses a three-dimensional curved surface that is at least first-order differentiable and expresses the first region, the second region, the third region, and the fourth region in the two-dimensional coordinate system, and pixel values at respective positions in the two-dimensional coordinate system on the first boundary line and the second boundary line.

* * * * *